(12) United States Patent
Sasaki et al.

(10) Patent No.: US 10,741,135 B2
(45) Date of Patent: Aug. 11, 2020

(54) LIQUID CRYSTAL DISPLAY DEVICE

(71) Applicant: SHARP KABUSHIKI KAISHA, Sakai, Osaka (JP)

(72) Inventors: Takahiro Sasaki, Sakai (JP); Hidefumi Yoshida, Sakai (JP); Kazutaka Hanaoka, Sakai (JP); Kimiaki Nakamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/358,321

(22) Filed: Mar. 19, 2019

(65) Prior Publication Data

US 2019/0295482 A1 Sep. 26, 2019

(30) Foreign Application Priority Data

Mar. 23, 2018 (JP) .................... 2018-057180

(51) Int. Cl.
*G09G 3/36* (2006.01)
*G02F 1/13357* (2006.01)
*G02F 1/1343* (2006.01)

(52) U.S. Cl.
CPC ......... *G09G 3/3607* (2013.01); *G02F 1/1336* (2013.01); *G02F 1/134309* (2013.01); *G09G 3/3648* (2013.01); *G09G 2310/0235* (2013.01)

(58) Field of Classification Search
CPC ............... G09G 3/3607; G09G 3/3648; G09G 2310/0235; G02F 1/134309; G02F 2001/134345
See application file for complete search history.

(56) References Cited

U.S. PATENT DOCUMENTS

| | | | |
|---|---|---|---|
| 2002/0105610 A1* | 8/2002 | Takeda | G02F 1/133707 349/129 |
| 2007/0030233 A1 | 2/2007 | Chai et al. | |
| 2008/0151146 A1* | 6/2008 | Koito | G02F 1/133707 349/84 |

FOREIGN PATENT DOCUMENTS

JP 4579204 B2 11/2010

\* cited by examiner

*Primary Examiner* — Phu Vu
(74) *Attorney, Agent, or Firm* — ScienBiziP, P.C.

(57) ABSTRACT

A liquid crystal display device includes sub-pixel electrodes respectively provided to three sub-pixels, and an interelectrode connection portion that connects sub-pixel electrodes adjacent to each other among the sub-pixel electrodes. The interelectrode connection portion is provided in a position where boundaries of liquid crystal alignment directions of sub-pixels adjacent to each other are connected.

5 Claims, 23 Drawing Sheets

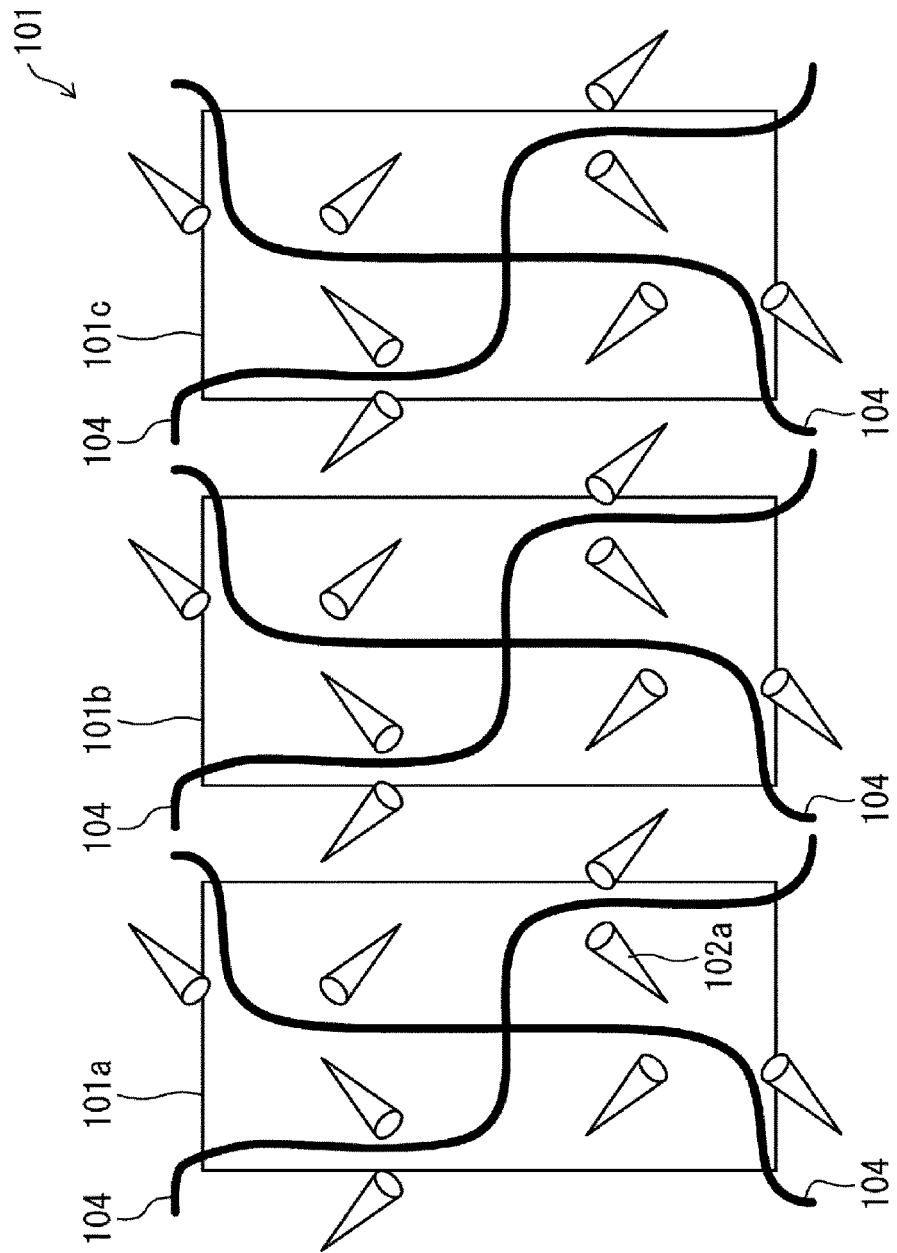

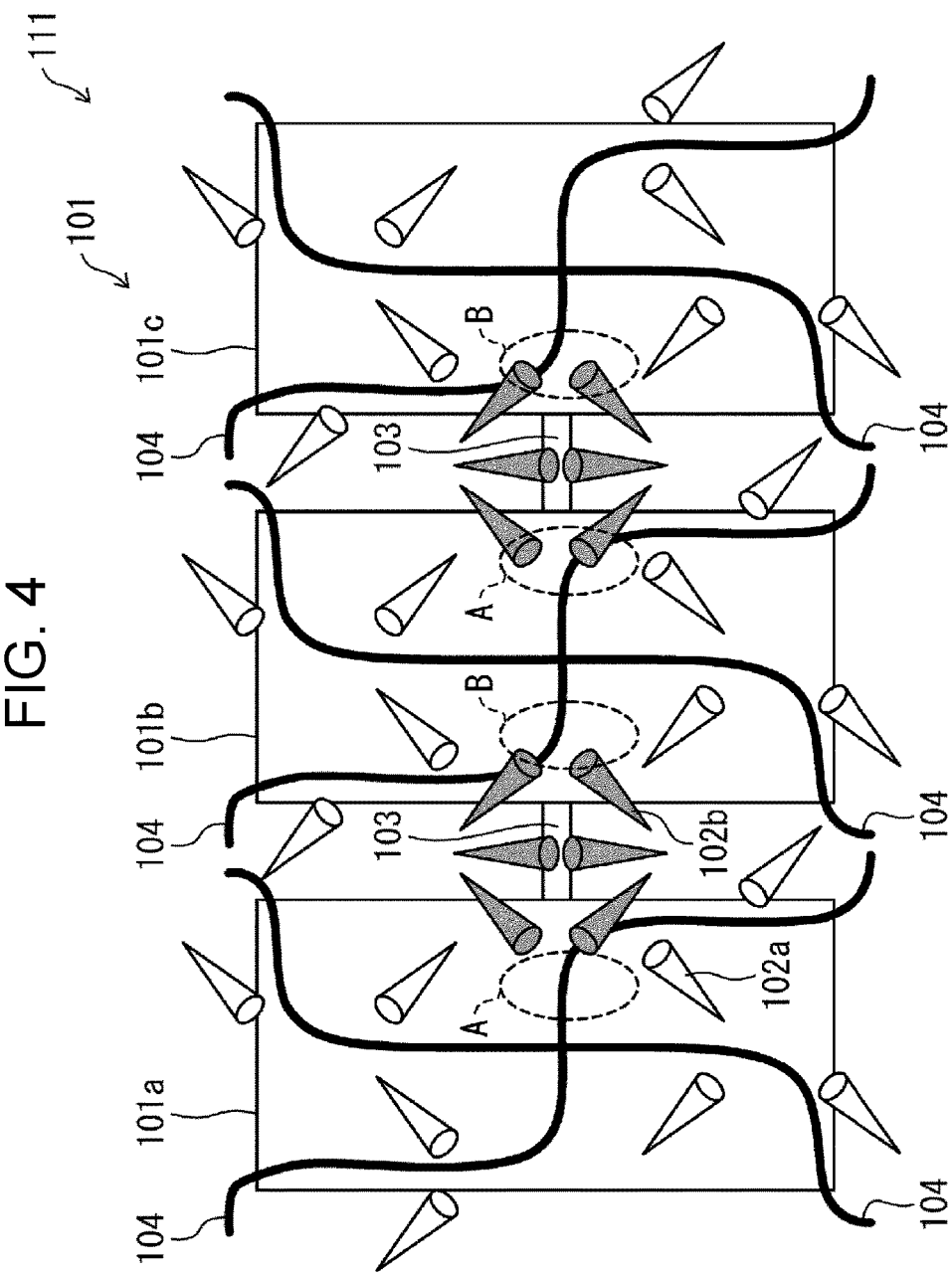

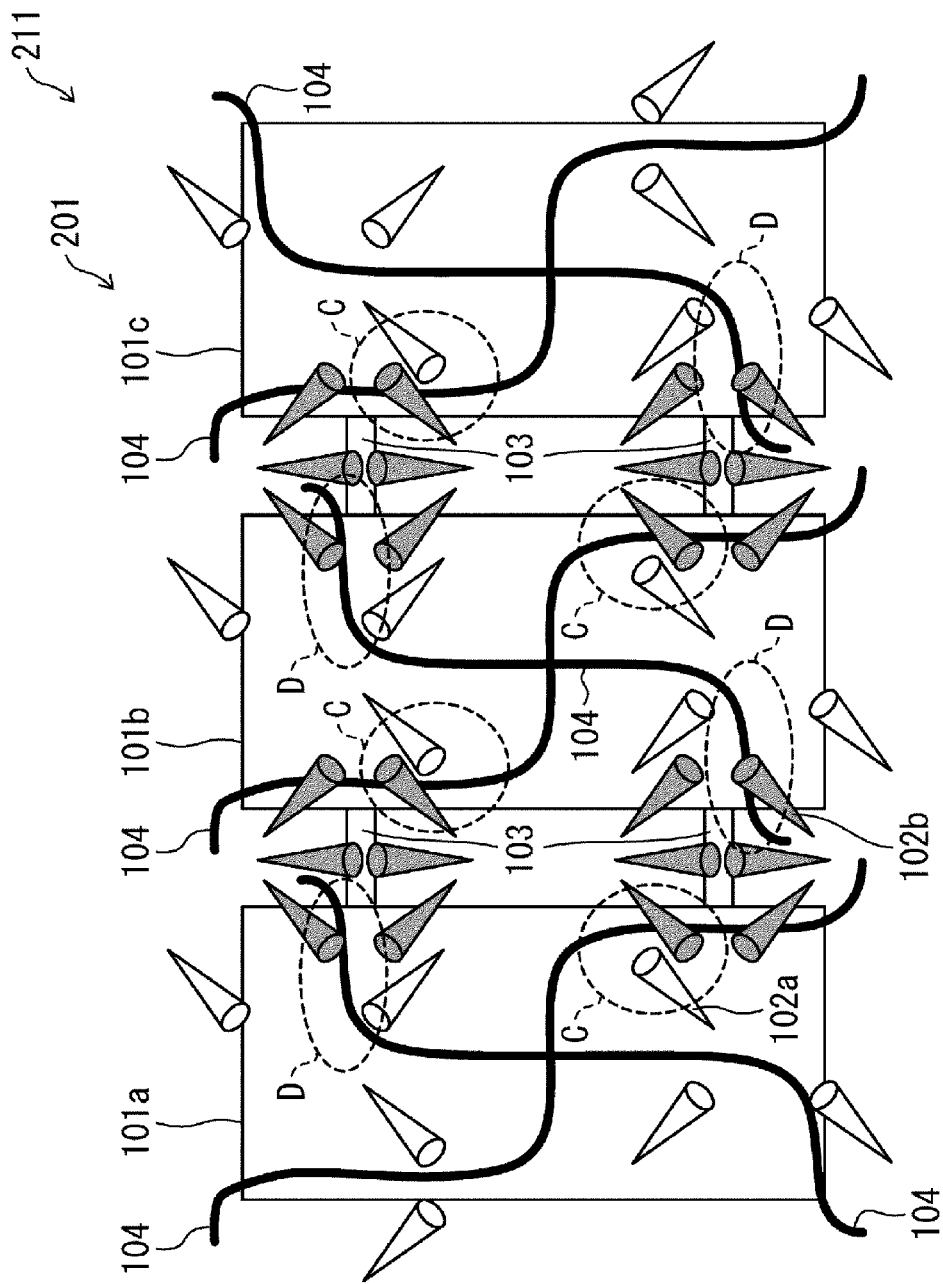

BOUNDARY PORTION E: BOUNDARY PORTION BETWEEN REGION WHERE LIQUID CRYSTAL MOLECULES FACE UPPER RIGHT AND REGION WHERE LIQUID CRYSTAL MOLECULES FACE LOWER LEFT

BOUNDARY PORTION F: BOUNDARY PORTION BETWEEN REGION WHERE LIQUID CRYSTAL MOLECULES FACE LOWER RIGHT AND REGION WHERE LIQUID CRYSTAL MOLECULES FACE UPPER LEFT

BOUNDARY PORTION H: BOUNDARY PORTION BETWEEN REGION WHERE LIQUID CRYSTAL MOLECULES FACE UPPER RIGHT AND REGION WHERE LIQUID CRYSTAL MOLECULES FACE LOWER LEFT

BOUNDARY PORTION I: BOUNDARY PORTION BETWEEN REGION WHERE LIQUID CRYSTAL MOLECULES FACE LOWER RIGHT AND REGION WHERE LIQUID CRYSTAL MOLECULES FACE UPPER LEFT

BOUNDARY PORTION J: BOUNDARY PORTION BETWEEN REGION WHERE LIQUID CRYSTAL MOLECULES FACE UPPER RIGHT AND REGION WHERE LIQUID CRYSTAL MOLECULES FACE LOWER LEFT

BOUNDARY PORTION K: BOUNDARY PORTION BETWEEN REGION WHERE LIQUID CRYSTAL MOLECULES FACE LOWER RIGHT AND REGION WHERE LIQUID CRYSTAL MOLECULES FACE UPPER LEFT

LIQUID CRYSTAL DISPLAY DEVICE

BACKGROUND

1. Field

The present disclosure relates to a liquid crystal display device that can be used as, for example, a time-division drive type liquid crystal display device.

2. Description of the Related Art

Conventionally, for example, a time-division drive type liquid crystal display device of FSC (Field Sequential Color) system is known. As described in Japanese Patent No. 4579204, the liquid crystal display device writes a signal by scanning three gate lines at a time.

However, as described in Japanese Patent No. 4579204, in a configuration where a gate driver drives three gate lines at the same time, a region where the gate lines are drawn is three times the region in a configuration where the gate driver drives the gate lines one by one. Therefore, for example, when designing a time-division drive type liquid crystal display device where the gate driver drives three gate lines at the same time, a large design change is required for a design of a liquid crystal display device where the gate driver drives the gate lines one by one. Therefore, the time-division drive type liquid crystal display device has to be manufactured by newly designing a mask, so that design cost is high.

Therefore, to reduce the design cost, it is considered to connect three sub-pixel electrodes together to form, one pixel electrode by using a design of a conventional liquid crystal display device having a sub-pixel electrode for every three sub-pixels. However, when simply connecting three sub-pixel electrodes together, liquid crystal alignment directions are largely changed from a state before the sub-pixel electrodes are connected together, so that there is a problem that luminance degradation and display failure of the liquid crystal display device occur.

Therefore, it is desirable to provide a liquid crystal display device that can reduce design cost and suppress luminance degradation and display failure.

SUMMARY

According to an aspect of the disclosure, there is provided a liquid crystal display device provided with a plurality of pixels, each of which is composed of divided three sub-pixels. The liquid crystal display device includes sub-pixel electrodes respectively provided to the sub-pixels, and an interelectrode connection portion that connects sub-pixel electrodes adjacent to each other among the sub-pixel electrodes. The interelectrode connection portion is provided in a position where boundaries of liquid crystal alignment directions of sub-pixels adjacent to each other are connected.

BRIEF DESCRIPTION OF THE DRAWINGS

FIG. 3 is an explanatory diagram showing liquid crystal alignment directions in a state where the sub-pixel electrodes of the pixel electrode shown in FIG. 1 are not connected to each other;

FIG. 4 is an explanatory diagram showing liquid crystal alignment directions in the liquid crystal display panel having the pixel electrode shown in FIG. 1;

FIG. 5 is an explanatory diagram shewing liquid crystal alignment directions in a liquid crystal display panel according to a comparative example of the pixel electrode shown in FIG. 1;

DESCRIPTION OF THE EMBODIMENTS

First Embodiment

Figure 1:
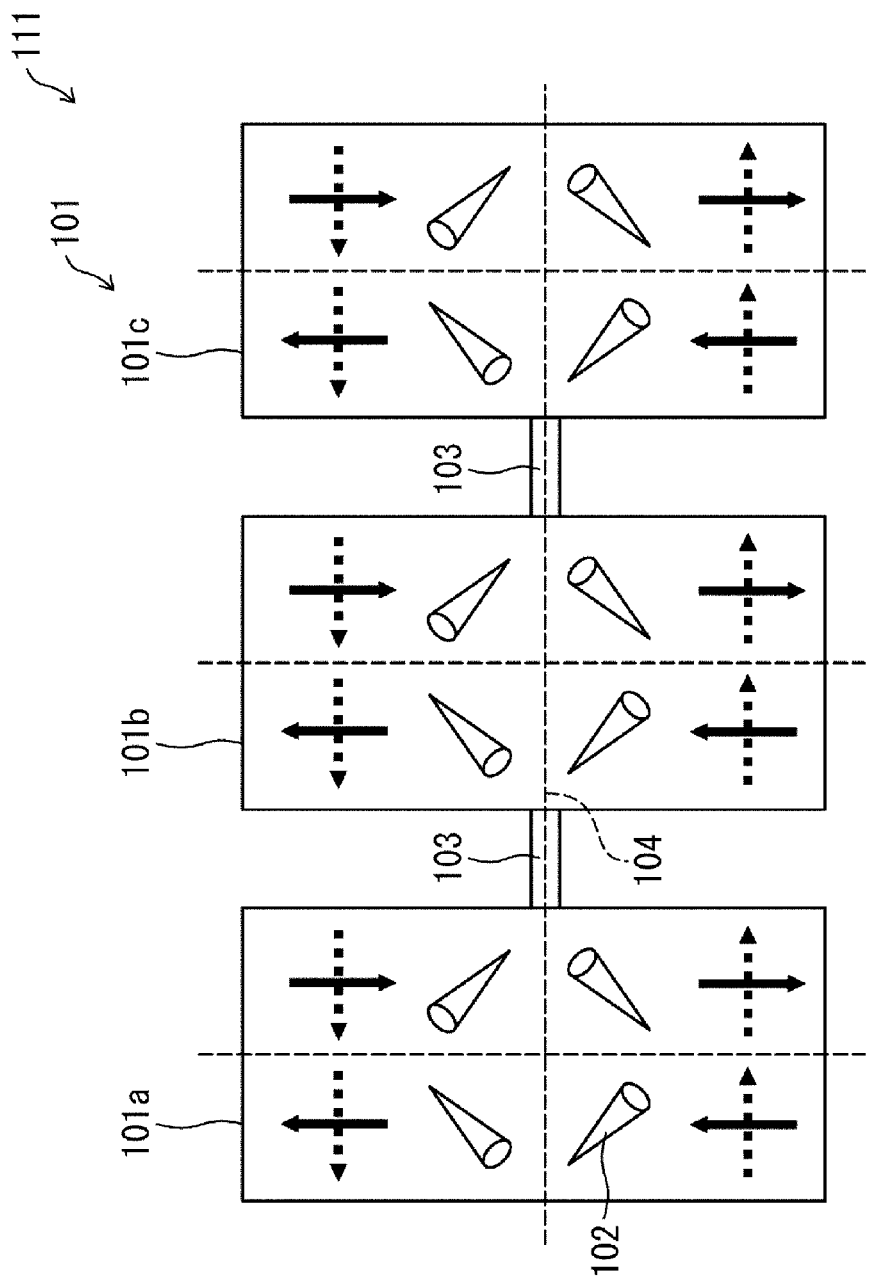
FIG. 1 is an explanatory diagram of a liquid crystal display panel having an pixel electrode formed by connecting three divided sub-pixel electrodes of a liquid crystal display device of an embodiment of the present disclosure.
Figure 2:
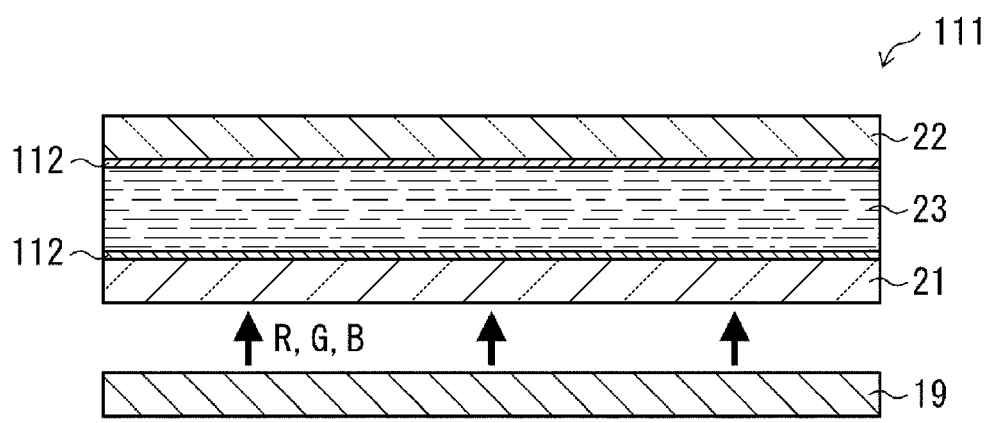
FIG. 2 is a schematic vertical cross-sectional view of the liquid crystal display panel included in the liquid crystal display device of the embodiment of the present disclosure.

An embodiment of the present disclosure will be described below with reference to the drawings. FIG. 1 is an explanatory diagram of a liquid crystal display panel 111 having an pixel electrode 101 formed by connecting three divided sub-pixel (picture element) electrodes 101a to 101c of a liquid crystal display device of the present embodiment. FIG. 2 is a schematic vertical cross-sectional view of the liquid crystal display panel 111 included in the liquid crystal display device of the present embodiment.

As shown in FIG. 2, in the liquid crystal display panel 111, a TFT substrate (active matrix substrate) 21 and a counter substrate 22 are arranged facing each other, and a liquid crystal layer 23 is provided between the TFT substrate 21 and the counter substrate 22. An alignment film 112 is provided to an inner surface of each of the TFT substrate 21 and the counter substrate 22. Reference numeral 19 denotes a backlight device. The configuration of the liquid crystal display panel 111 is the same as those of liquid crystal display panels of the other embodiments described below.

(Configuration of Liquid Crystal Display Panel 111)

In the liquid crystal display panel 111, as shown in FIG. 1, one pixel electrode 101 is formed by connecting three divided sub-pixel (picture element) electrodes 101a to 101c. A liquid crystal mode of the liquid crystal display panel 111 is a vertically aligned multi-domain type and is a mode called UV2A that performs alignment control by optical alignment.

The TFT substrate 21 of the liquid crystal display panel 111 is designed by using a design of a conventional TFT substrate of a liquid crystal display panel including a color filter. In the conventional TFT substrate, each pixel included in each row is divided into three sub-pixels (picture elements) for red, green, and blue, and sub-pixel electrodes 101a to 101c corresponding to these sub-pixels are included. In the liquid crystal display panel 111, the color filter of the conventional liquid crystal display panel is removed. The same goes for liquid crystal display panels of the other embodiments described later.

In the liquid crystal display panel 111, specifically, the sub-pixel electrode 101a and the sub-pixel electrode 101b are connected by one interelectrode connection portion 103, and similarly, the sub-pixel electrode 101b and the sub-pixel electrode 101c are connected by one interelectrode connection portion 103.

FIG. 1 shows a relationship between alignment directions of liquid crystal molecules 102 (hereinafter, simply referred to as liquid crystal alignment directions) in each sub-pixel (picture element) electrode corresponding to each sub-pixel electrode 101a to 101c and positions of the interelectrode connection portions 103.

In FIG. 1, arrows (solid arrow and dotted arrow) indicate liquid crystal alignment control directions on a substrate. The solid arrow indicates a liquid crystal alignment control direction of an upper substrate (counter substrate 22), and the dotted arrow indicates a liquid crystal alignment control direction of a lower substrate (TFT substrate 21). A rod with a thin tip is liquid crystal molecules 102. An orientation of the liquid crystal molecules 102 indicates a liquid crystal alignment direction of a thickness direction center of a liquid crystal cell. Dotted lines that divide a sub-pixel into four parts indicate boundaries of regions whose liquid crystal alignment directions are different from each other (hereinafter the boundaries are referred to as liquid crystal alignment boundaries).

The interelectrode connection portion 103 connects sub-pixel electrodes adjacent to each other (the sub-pixel electrode 101a and the sub-pixel electrode 101b, and the sub-pixel electrode 101b and the sub-pixel electrode 101c) in a position where the liquid crystal alignment boundaries of the sub-pixels are connected. In the present embodiment, the position of the interelectrode connection portion 103 is one place in a central portion of a long side of the sub-pixel electrodes 101a to 101c.

(Liquid Crystal Alignment Direction in a State where Sub-Pixel Electrodes are Mot Connected to Each Other)

FIG. 3 is an explanatory diagram showing the liquid crystal alignment directions in a state where the sub-pixel electrodes 101a to 101c of the pixel electrode 101 shown in FIG. 1 are not connected to each other.

In a state where the sub-pixel electrodes 101a to 101c are not connected to each other by the interelectrode connection portions 103, the liquid crystal alignment directions of each sub-pixel corresponding to the sub-pixel electrodes 101a to 101c are as shown in FIG. 3. An absorption axis of a polarizing plate provided to the upper substrate is a left-right direction (solid line) of FIG. 3, and an absorption axis of a polarizing plate provided to the lower substrate is an up-down direction (dashed line) of FIG. 3.

In the example shown in FIG. 3, in each sub-pixel electrode 101a to 101c, four regions occur, whose alignment directions (liquid crystal alignment directions) of liquid crystal molecules 102a are different from each other, around the center of the sub-pixel (sub-pixel electrodes 101a to 101c). In the four regions, reversed-flyfot-shaped dark lines (regions where an orientation of the liquid crystal molecules 102a is aligned to a polarization axis) form the liquid crystal alignment boundaries 104.

(Liquid Crystal Alignment Direction in the Liquid Crystal Display Panel 111)

FIG. 4 is an explanatory diagram showing the liquid crystal alignment directions in the liquid crystal display panel 111 having the pixel electrode 101 shown in FIG. 1. In FIG. 4, the alignment directions of the liquid crystal molecules 102a in a sub-pixel is indicated by white rods, and the alignment directions of the liquid crystal molecules 102b generated by providing the interelectrode connection portions 103 are indicated by gray rods.

According to the connection between the sub-pixel electrodes 101a to 101c at the positions of the interelectrode connection portions 103 shown in FIG. 1, as shown in FIG. 4, the liquid crystal alignment directions are not largely different from the liquid crystal alignment directions in a case where no interelectrode connection portion 103 is provided as shown in FIG. 3. Further, in the liquid crystal display panel 111 shown in FIG. 1 (FIG. 4), luminance degradation and display failure do not occur.

COMPARATIVE EXAMPLE 1

FIG. 5 is an explanatory diagram showing the liquid crystal alignment directions in a liquid crystal display panel according to a comparative example of the pixel electrode 101 shown in FIG. 1. In a pixel electrode 201 of a liquid crystal display panel 211 shown in FIG. 5, different from the position of the interelectrode connection portion 103 of the pixel electrode 101, the interelectrode connection portion 103 is provided at two locations of positions different from the liquid crystal alignment boundaries 104 of the sub-pixel.

In the liquid crystal display panel 211, the interelectrode connection portions 103 are provided as shown in FIG. 5. As a result, a region (region C) where the alignment directions are largely different and a region (region D) where a dark line enters inside of the pixel occur in the sub-pixel and in a position of the interelectrode connection portion 103. It is known that a state of such liquid crystal alignment directions largely varies from a state of the liquid crystal alignment directions in the state where the sub-pixel electrodes 101a to 101c are not connected to each other shown in FIG. 3.

The state of the liquid crystal alignment directions as described above in the liquid crystal display panel 211 occurs because two different alignment controls in the sub-pixel and at the interelectrode connection portion 103 compete with each other. In such a liquid crystal display panel 211, a liquid crystal alignment state becomes unstable, and luminance degradation and display failure occur.

(Advantages of Liquid Crystal Display Device Including Liquid Crystal Display Panel 111)

In the TFT substrate 21 of the liquid crystal display panel 111, one pixel electrode 101 is formed by connecting the three sub-pixel electrodes 101a to 101c by the interelectrode connection portion 103 by using design of a conventional TFT substrate of a liquid crystal display panel including a color filter. Thereby, it is possible to reduce design cost and manufacture a liquid crystal display device of, for example, a field sequential color system at low price. The same goes for liquid crystal display devices of the other embodiments described later.

The interelectrode connection portions 103 that electrically connect the sub-pixel electrodes 101a to 101c adjacent to each other are provided at positions where the liquid crystal alignment boundaries 104 of the sub-pixels are connected together. Thereby, the liquid crystal alignment directions in the liquid crystal display panel 111 are not largely different from the liquid crystal alignment directions in a case where no interelectrode connection portion 103 is provided, and it is possible to suppress influence on the liquid crystal alignment directions in each sub-pixel due to provision of the interelectrode connection portions 103. As a result, the liquid crystal display panel 111 can prevent luminance degradation and display failure from occurring.

Second Embodiment

Another embodiment of the present disclosure will be described with reference to the drawings. For convenience of description, members that have the same functions as those of the members described in the above embodiment will be denoted by the same reference numerals, and descriptions thereof will be omitted.

Figure 6A:
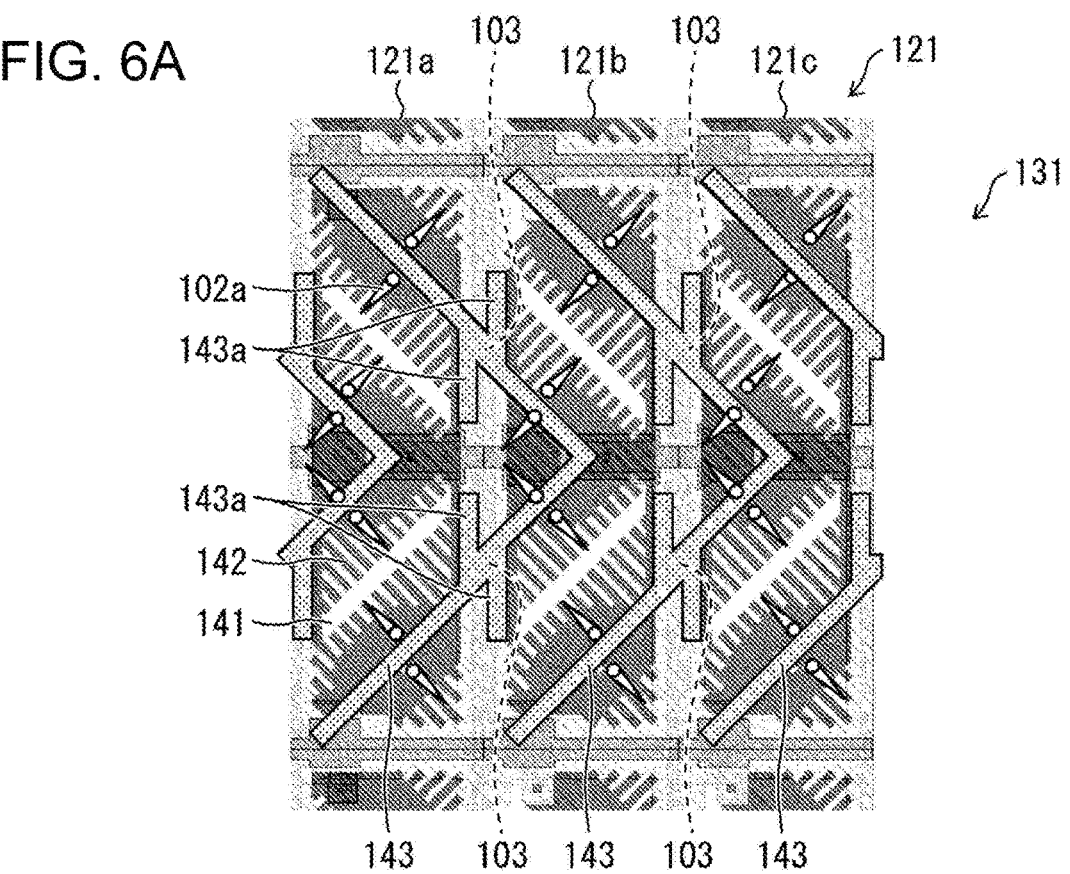
FIG. 6A is an explanatory diagram of a liquid crystal display panel having an pixel electrode formed by connecting three divided sub-pixel electrodes of a liquid crystal display device of another embodiment of the present disclosure.
Figure 6B:
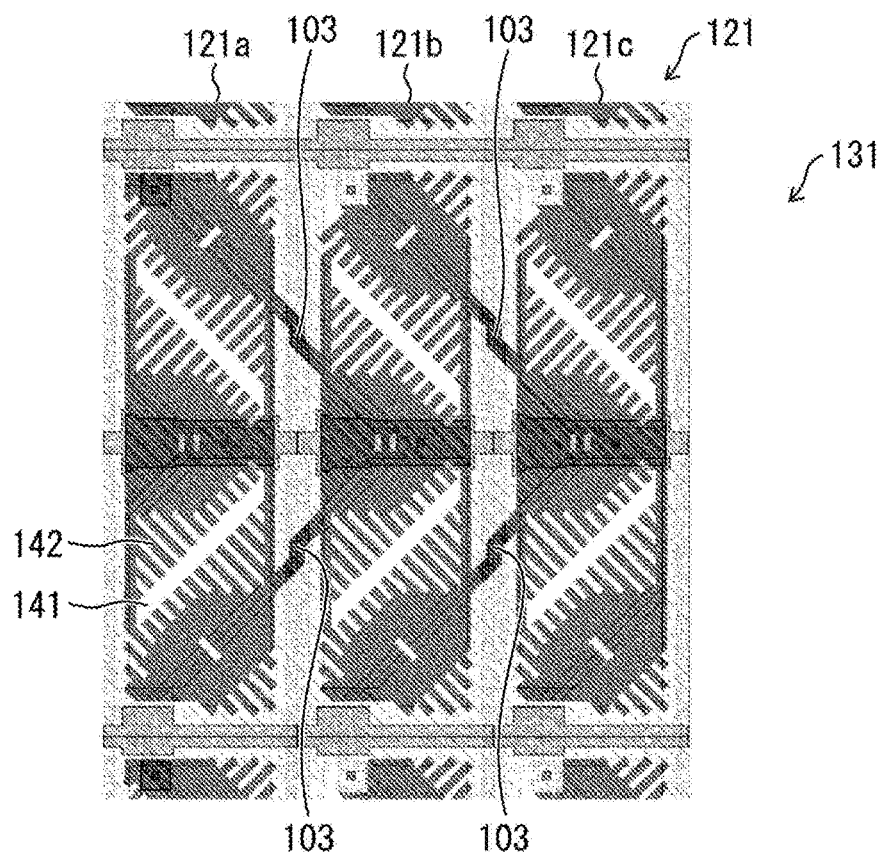
FIG. 6B is an explanatory diagram showing a state where structures on a counter substrate are removed from the liquid crystal display panel shown in FIG. 6A.

FIG. 6A is an explanatory diagram of a liquid crystal display panel 131 having an pixel electrode 121 formed by connecting three divided sub-pixel electrodes (picture elements) 121a to 121c of a liquid crystal display device of the present embodiment, and FIG. 6B is an explanatory diagram showing a state where structures 143 on a counter substrate 22 (see FIG. 2) are removed from the liquid crystal display panel 131 shown in FIG. 6A.

For convenience, FIG. 6A shows the liquid crystal alignment directions (alignment directions of the liquid crystal molecules 102a) before the sub-pixel electrodes 121a to 121c are connected by the interelectrode connection portions 103. Specifically, FIG. 6A shows the structures 143 that control the liquid crystal alignment directions in the sub-pixels, the liquid crystal alignment directions, and positions of the interelectrode connection portions 103. However, in FIG. 6A and FIGS. 7 and 8 described later, the interelectrode connection portions 103 are hidden under the structures 143. In FIG. 6B, the structures 143 are removed in order to easily identify the interelectrode connection portions 103.

(Configuration of Liquid Crystal Display Panel 131)

In the liquid crystal display panel 131, as shown in FIG. 6A, one pixel electrode 121 is formed by connecting adjacent sub-pixel (picture element) electrodes of the three divided sub-pixel (picture element) electrodes 121a to 121c by the interelectrode connection portions 103. A liquid crystal mode of the liquid crystal display panel 131 is a vertically aligned multi-domain type and is a mode called MVA that controls the liquid crystal alignments by using a structure and/or a slit provided on a substrate.

The sub-pixel electrodes 121a to 121c shown in FIG. 6A are provided on the TFT substrate 21 (see FIG. 2) of the liquid crystal display panel 131. In the sub-pixel electrodes 121a to 121c, white portions are alignment control slits 141 and fine slits 142. Further, alignment control structures 143 are provided on the counter substrate 22 (see FIG. 2). Desired liquid crystal alignment directions of the liquid crystal molecules 102a are realized in the sub-pixels by the structures 143, the slits 141, and the fine slits 142.

The structure 143 has branch extension portions 143a extending along a long side direction of the sub-pixel electrodes 101a to 101c between the sub-pixel electrodes 101a to 101c adjacent to each other. The branch extension portions 143a are provided to correct the liquid crystal alignment directions in end edge portions of sub-pixels. Specifically, the liquid crystal alignment directions in end edge portions of sub-pixels do not correspond to the liquid crystal alignment directions inside the sub-pixels, so that the luminance of the liquid crystal display panel 131 degrades as it is. Therefore, by providing the branch extension portions 143a, the liquid crystal alignment directions in end edge portions of sub-pixels are corrected so as to correspond to the liquid crystal alignment directions inside the sub-pixels, so that the luminance of the liquid crystal display panel 131 is prevented from degrading.

In the liquid crystal display panel 131, the sub-pixel electrode 121a and the sub-pixel electrode 121b are connected by two interelectrode connection portions 103, and in the same manner, the sub-pixel electrode 121b and the sub-pixel electrode 121c are connected by two interelectrode connection portions 103.

As shown in FIG. 6A, the interelectrode connection portion 103 is provided in a region which at least partially overlaps with the structure 143 located between sub-pixels adjacent to each other. Specifically, the structure 143 has a shape continuing over sub-pixels adjacent to each other (at least two structures 143 are formed so as to straddle the sub-pixels adjacent to each other), and two structures 143 are inclined in opposite directions to form a symmetrical shape with respect to the center of the long side of the sub-pixels (sub-pixel electrodes 121a to 121c). Therefore, the structure 143 has two connection portions between the sub-pixels adjacent to each other. The interelectrode connection portion 103 is provided for each two structures 143. The interelectrode connection portion 103 is provided immediately below a connection portion of the two structures 143 so as to connect the sub-pixel electrodes 121a to 121c adjacent to each other in a position where a center line of the interelectrode connection portion 103 overlaps with a center line of the connection portion of the structures 143. The interelectrode connection portion 103 may be provided so as to overlap with at least part of corresponding structures 143 (the connection portion of the structures 143) whose arrangement state is preferable.

As shown in FIG. 6A, the liquid crystal alignment directions in regions over sub-pixels adjacent to each other which are partitioned by the structures 143 are the same.

(Liquid Crystal Alignment Directions in Liquid Crystal Display Panel 131 and Advantages)

Figure 7:
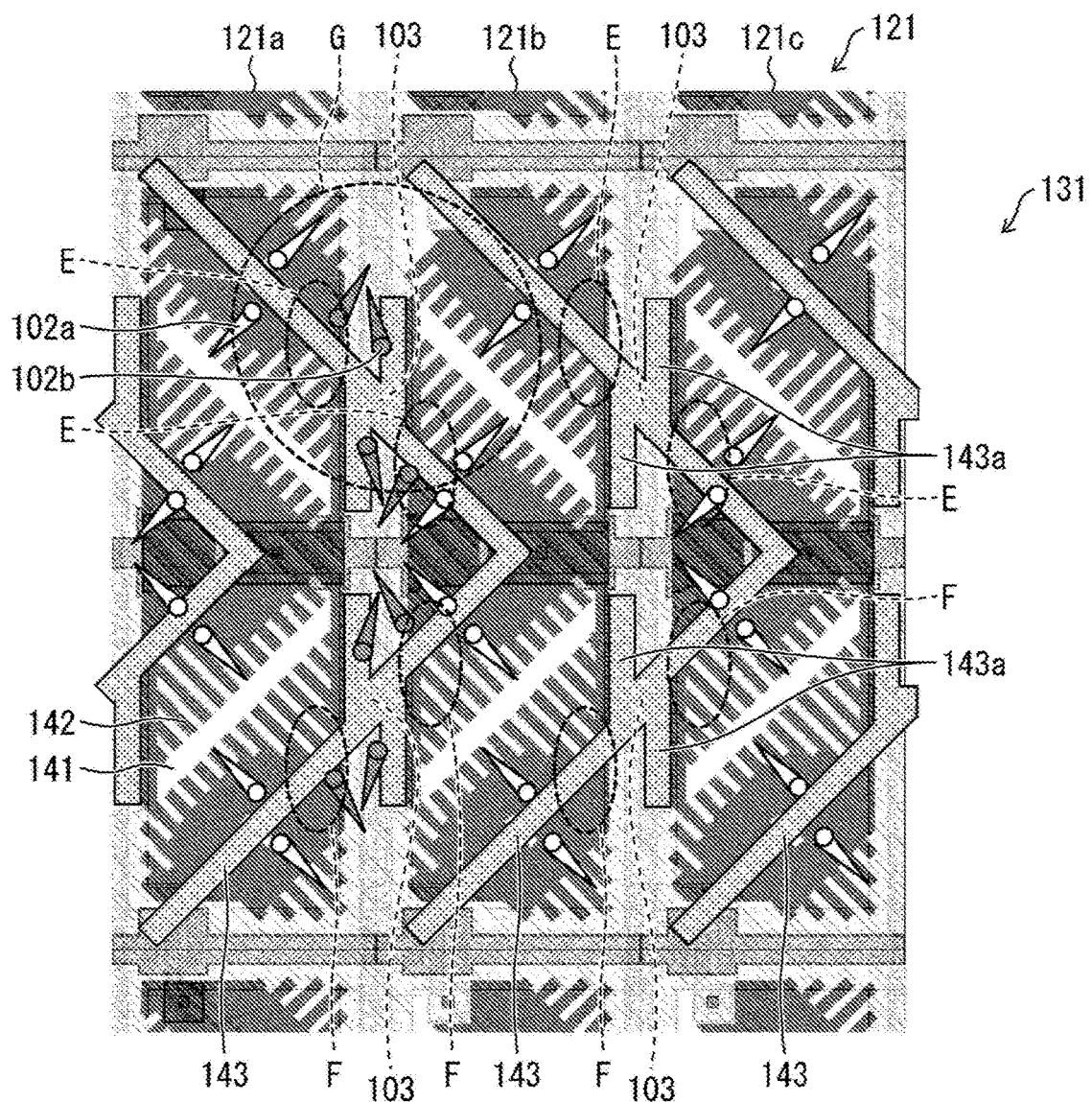
FIG. 7 is an explanatory diagram showing liquid crystal alignment directions in the liquid crystal display panel shown in FIG. 6A.
Figure 8:
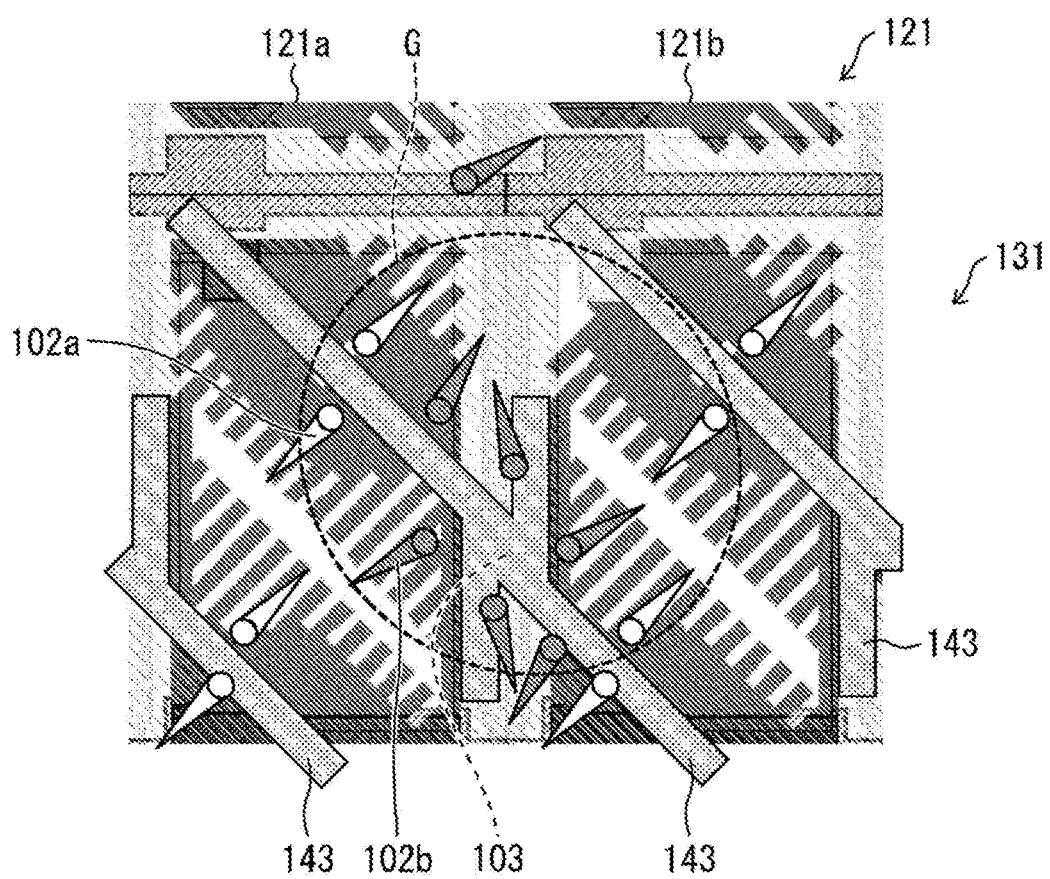
FIG. 8 is an enlarged view of a region G shown in FIG. 7 and a vicinity of the region G.

FIG. 7 is an explanatory diagram showing the liquid crystal alignment directions in the liquid crystal display panel 131 having the pixel electrode 121. FIG. 8 is an enlarged view of a region G shown in FIG. 7 and a vicinity of the region G.

FIGS. 7 and 8 show a state where the liquid crystal alignment directions are changed from the state shown in FIG. 6A by forming the pixel electrode 121 by connecting the sub-pixel electrodes 121a to 121c by the interelectrode connection portions 103. In FIGS. 7 and 8, the alignment directions of the liquid crystal molecules 102a in a sub-pixel is indicated by white rods, and the alignment directions of the liquid crystal molecules 102b generated by providing the interelectrode connection portions 103 are indicated by gray rods.

In the liquid crystal display panel 131, the interelectrode connection portion 103 is provided immediately below a connection portion of two structures 143 of sub-pixels adjacent to each other (specifically, in a position where the center line of the interelectrode connection portion 103 overlaps with the center line of the connection portion of the structures 143), so that it is possible to realize a connection of the sub-pixel electrodes 121a to 121c, where boundaries of the liquid crystal alignment directions of sub-pixels adjacent to each other are connected.

Thereby, as shown in FIGS. 7 and 8, the liquid crystal alignment directions in the liquid crystal display panel 131 are hardly shifted from the liquid crystal alignment directions shown in FIG. 6A, and luminance degradation and display failure do not occur in the liquid crystal display panel 131.

Third Embodiment

Further another embodiment of the present disclosure will be described below with reference to the drawings. For convenience of description, members that have the same functions as those of the members described in the above embodiments will be denoted by the same reference numerals, and descriptions thereof will be omitted.

Figure 9A:
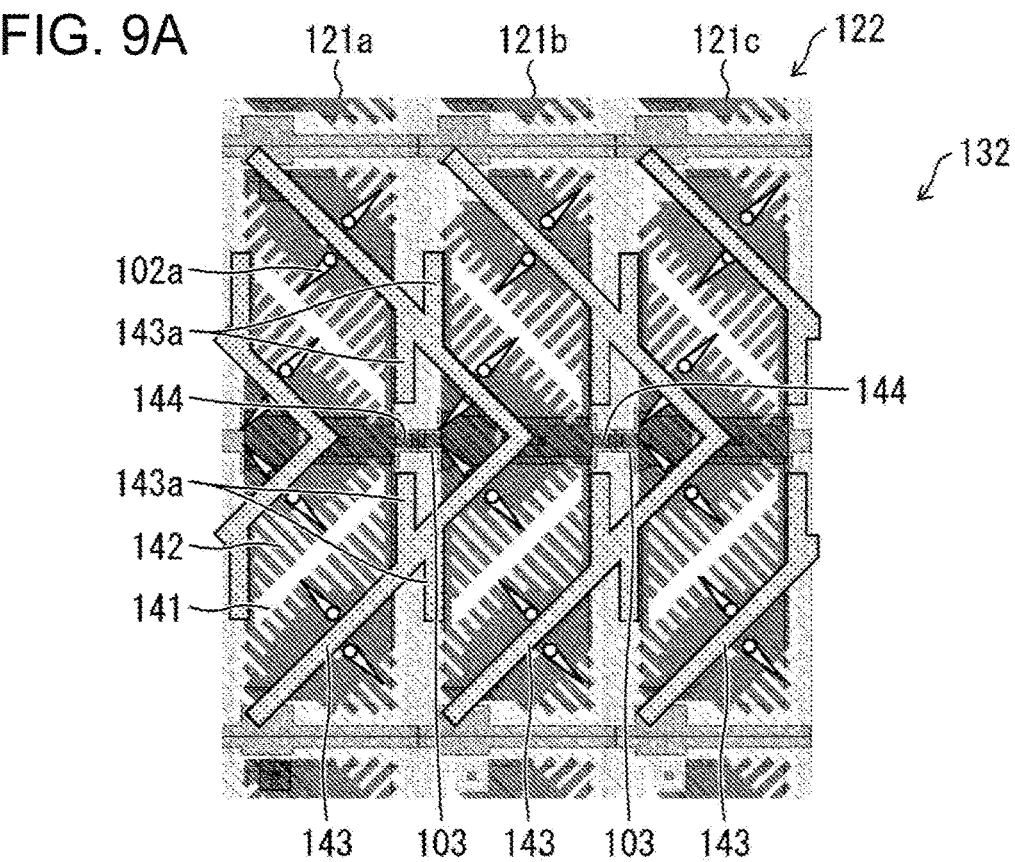
FIG. 9A is an explanatory diagram of a liquid crystal display panel having an pixel electrode formed by connecting three divided sub-pixel electrodes of a liquid crystal display device of another embodiment of the present disclosure.
Figure 9B:
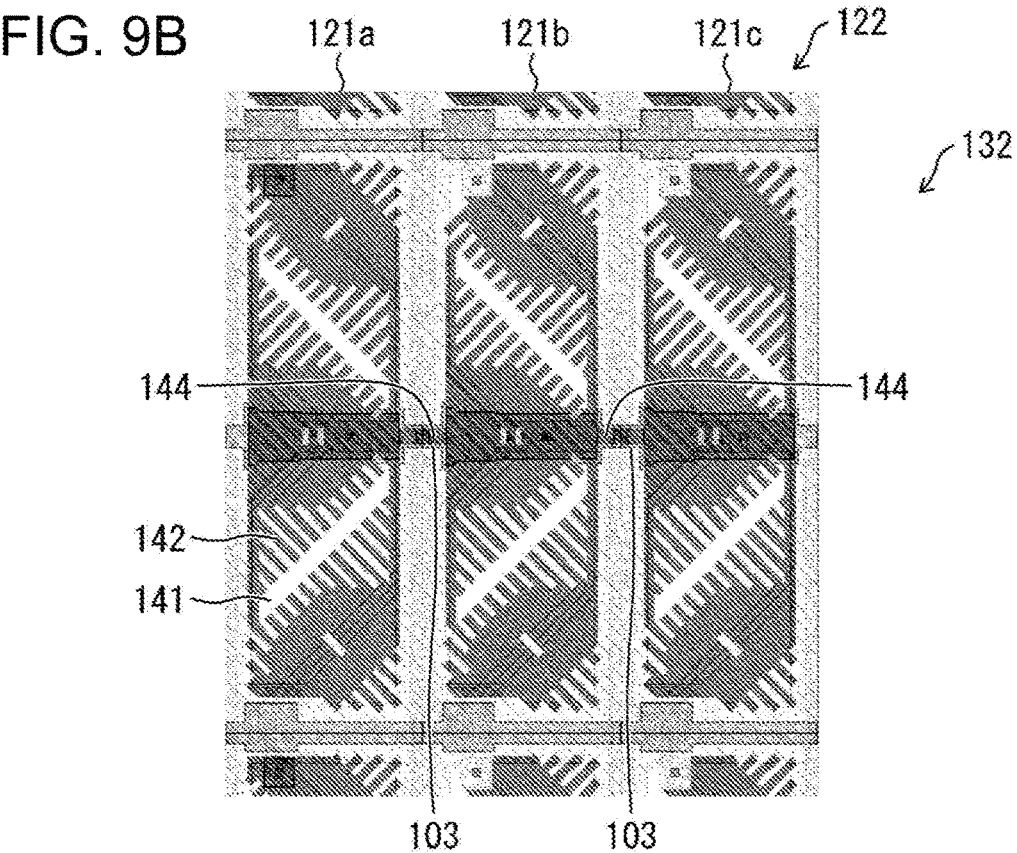
FIG. 9B is an explanatory diagram showing a state where structures on a counter substrate are removed from the liquid crystal display panel shown in FIG. 9A.

FIG. 9A is an explanatory diagram of a liquid crystal display panel 132 having an pixel electrode 121 formed by connecting three divided sub-pixel electrodes (picture elements) 121a to 121c of a liquid crystal display device of the present embodiment, and FIG. 9B is an explanatory diagram showing a state where structures 143 on a counter substrate 22 (see FIG. 2) are removed from the liquid crystal display panel 132 shown in FIG. 9A.

In the same manner as FIG. 6A, for convenience, FIG. 9A shows the liquid crystal alignment directions (alignment directions of the liquid crystal molecules 102a) before the sub-pixel electrodes 121a to 121c are connected by the interelectrode connection portions 103. In FIG. 9B, in the same manner as in FIG. 6B, the structures 143 are removed in order to easily identify the interelectrode connection portions 103.

(Configuration of Liquid Crystal Display Panel 132)

in the liquid crystal display panel 132, in the same manner as in the liquid crystal display panel 131, as shown in FIG. 9A, one pixel electrode 122 is formed by connecting adjacent sub-pixel (picture element) electrodes of the three divided sub-pixel (picture element) electrodes 121a to 121c by the interelectrode connection portions 103.

The position of the interelectrode connection portion 103 is one place in a central portion of a long side of the sub-pixel electrodes 121a to 121c.

Further, the position of the interelectrode connection portion 103 is a position overlapping with a Cs electrode (auxiliary capacitance electrode) 144 in plan view. The other configuration of the liquid crystal display panel 132 is the same as that of the liquid crystal display panel 131.

(Liquid Crystal Alignment Directions in Liquid Crystal Display Panel 132 and Advantages)

Figure 10:
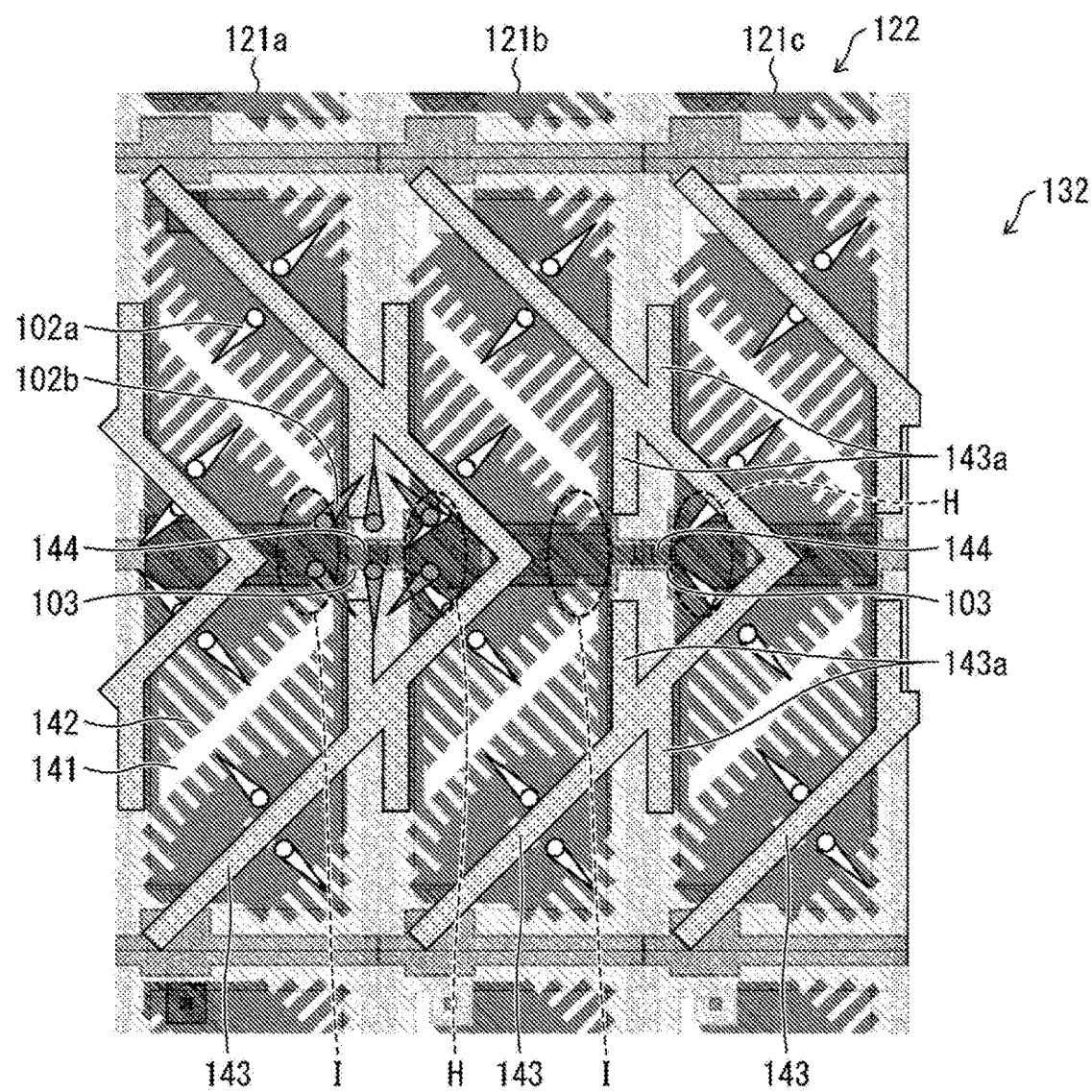
FIG. 10 is an explanatory diagram showing liquid crystal alignment directions in the liquid crystal display panel shown in FIG. 9A.

FIG. 10 is an explanatory diagram showing liquid crystal alignment directions in the liquid crystal display panel 132. FIG. 10 shows a state where the liquid crystal alignment directions are changed from the state shown in FIG. 9A by forming the pixel electrode 121 by connecting the sub-pixel electrodes 121a to 121c by the interelectrode connection portions 103. In FIG. 10, the alignment directions of the liquid crystal molecules 102a in a sub-pixel is indicated by white rods, and the alignment directions of the liquid crystal molecules 102b generated by providing the interelectrode connection portions 103 are indicated by gray rods.

In the liquid crystal display panel 132, the interelectrode connection portions 103 are provided in a central portion of a long side of the sub-pixel electrodes 121a to 121c, so that it is possible to realize a connection of the sub-pixel electrodes 121a to 121c, where boundaries of the liquid crystal alignment directions of sub-pixels adjacent to each other are connected.

Thereby, as shown in FIG. 10, the liquid crystal alignment directions in the liquid crystal display panel 132 are hardly shifted from the liquid crystal alignment directions shown in FIG. 9A. The position of the interelectrode connection portion 103 is a position overlapping with the Cs electrode 144 in plan view. The Cs electrode 144 is a light screening body. Therefore, change of the liquid crystal alignment directions is not visually recognized at the position of the interelectrode connection portion 103. Thus, in the liquid crystal display panel 132, luminance degradation and display failure do not occur.

The reason why the liquid crystal alignment directions shown in FIG. 10 are different from the liquid crystal alignment directions shown in FIG. 1 is because the interelectrode connection portion 103 is provided so as to overlap with the Cs electrode 144.

Fourth Embodiment

Further another embodiment of the present disclosure will be described below with reference to the drawings. For convenience of description, members that have the same functions as those of the members described in the above embodiments will be denoted by the same reference numerals, and descriptions thereof will be omitted.

Figure 11A:
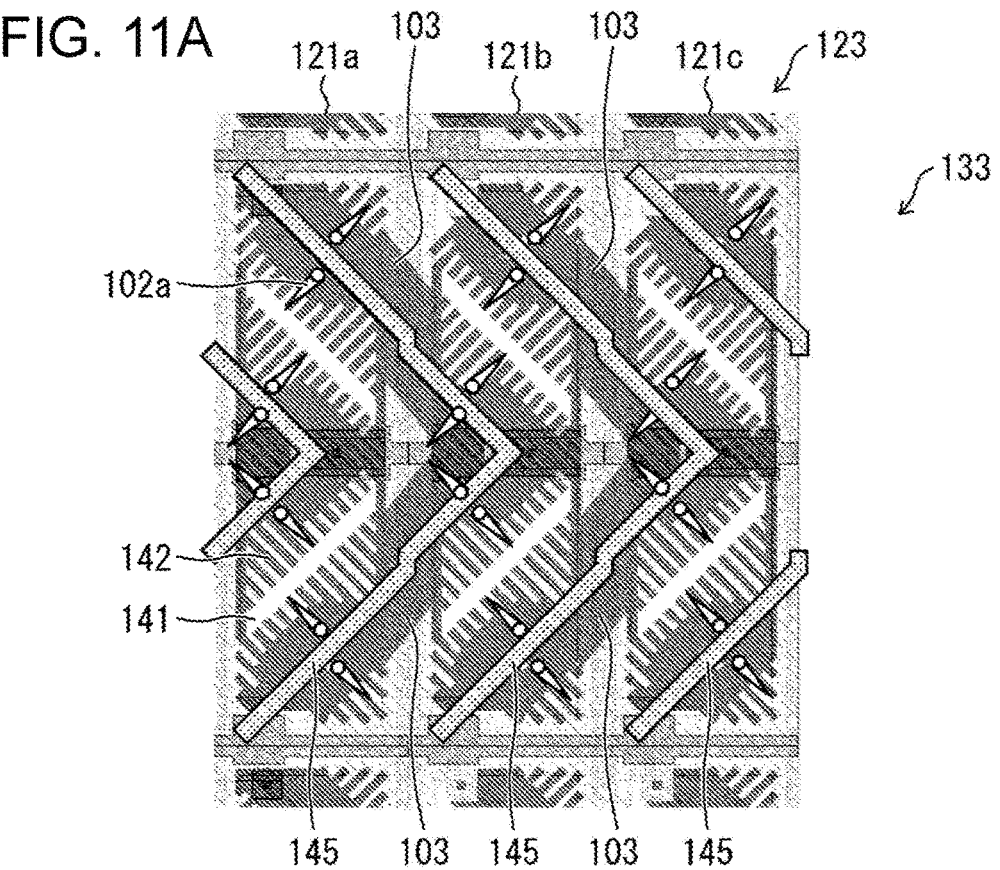
FIG. 11A is an explanatory diagram of a liquid crystal display panel having an pixel electrode formed by connecting three divided sub-pixel electrodes of a liquid crystal display device of further another embodiment of the present disclosure.
Figure 11B:
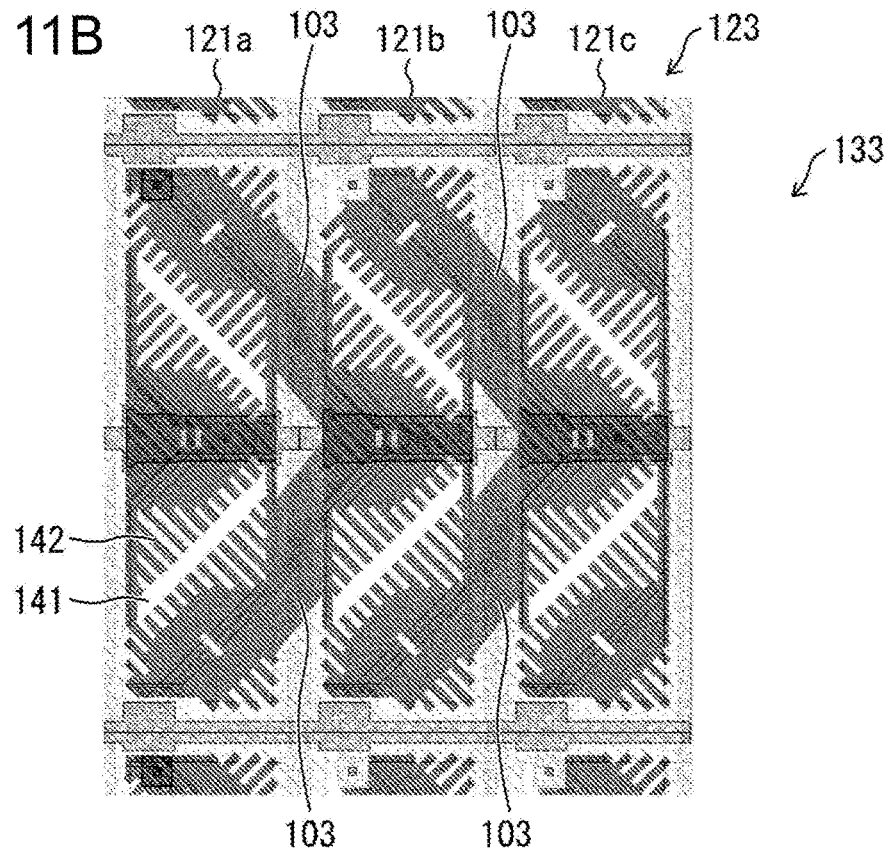
FIG. 11B is an explanatory diagram showing a state where a structure on a counter substrate is removed from the liquid crystal display panel shown in FIG. 11A.

FIG. 11A is an explanatory diagram of a liquid crystal display panel 133 having an pixel electrode 123 formed by connecting three divided sub-pixel electrodes (picture elements) 121a to 121c of a liquid crystal display device of the present embodiment, and FIG. 11B is an explanatory diagram showing a state where structures 145 on a counter substrate 22 (see FIG. 2) are removed from the liquid crystal display panel 132 shown in FIG. 10A.

In the same manner as FIG. 6A, for convenience, FIG. 11A shows the liquid crystal alignment directions of the liquid crystal molecules 102a before the sub-pixel electrodes 121a to 121c are connected by the interelectrode connection portions 103. In FIG. 11B, in the same manner as in FIG. 6B, the structures 145 are removed in order to easily identify the interelectrode connection portions 103.

(Configuration of Liquid Crystal Display Panel 133)

In the liquid crystal display panel 133, in the same manner as in the liquid crystal display panel 131, as shown in FIG. 11A, one pixel electrode 123 is formed by connecting adjacent sub-pixel (picture element) electrodes of the three divided sub-pixel (picture element) electrodes 121a to 121c by the interelectrode connection portions 103. The position of the interelectrode connection portion 103 of the liquid crystal display panel 133 is a region which at least partially overlaps with the structure 145 located between sub-pixels adjacent to each other in the same manner as in the case of FIG. 6A.

The width of the interelectrode connection portion 103 of the liquid crystal display panel 133 is larger than the widths of the interelectrode connection portions 103 of the liquid crystal display panels 111, 131, and 132. For example, when the widths of the interelectrode connection portions 103 of the liquid crystal display panels 111, 131, and 132 are 10 μm or less, the width of the interelectrode connection portion 103 of the liquid crystal display panel 133 is about 50 μm.

Figure 12:
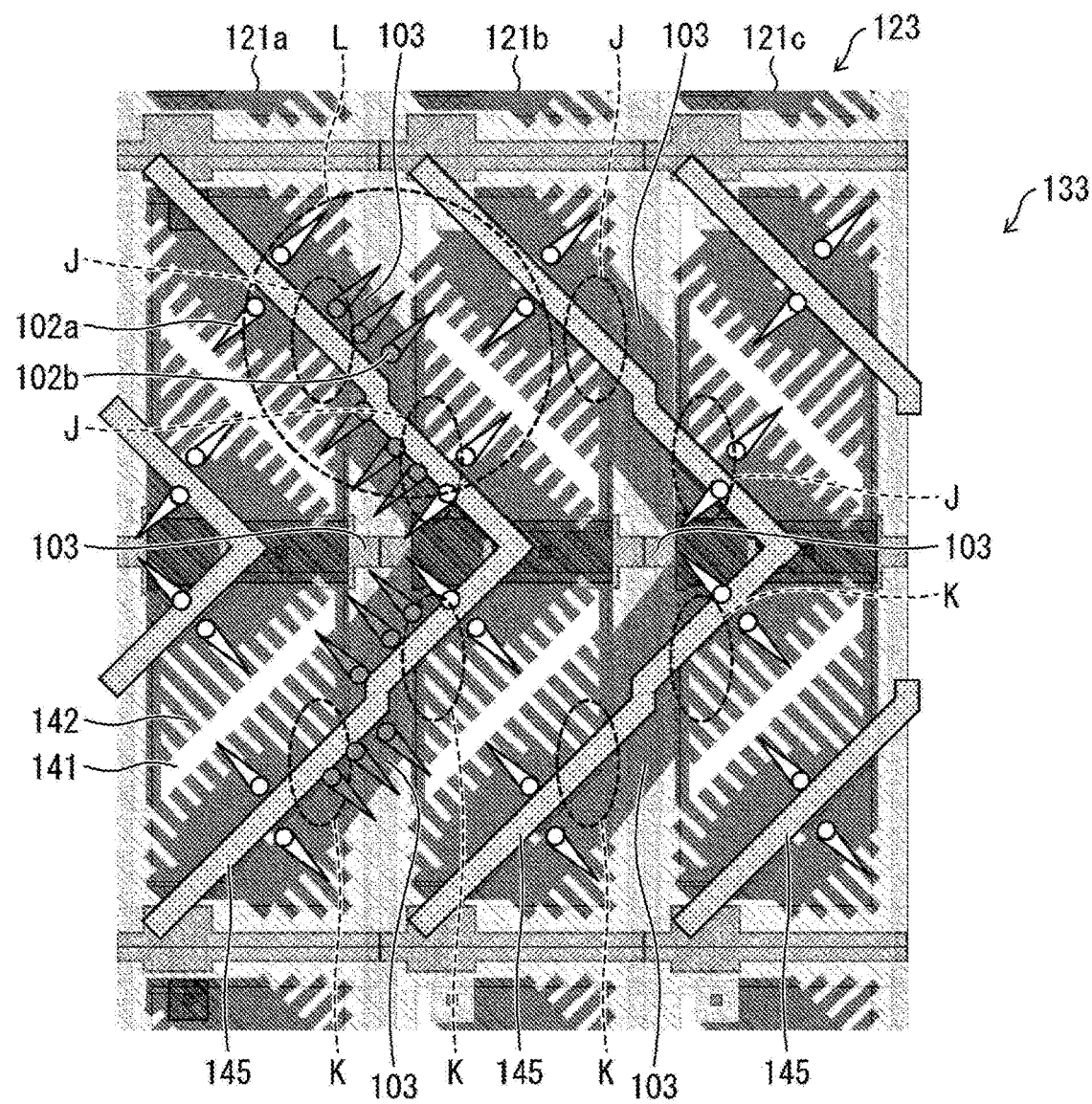
FIG. 12 is an explanatory diagram showing liquid crystal alignment directions in the liquid crystal display panel shown in FIG. 11A.
Figure 13:
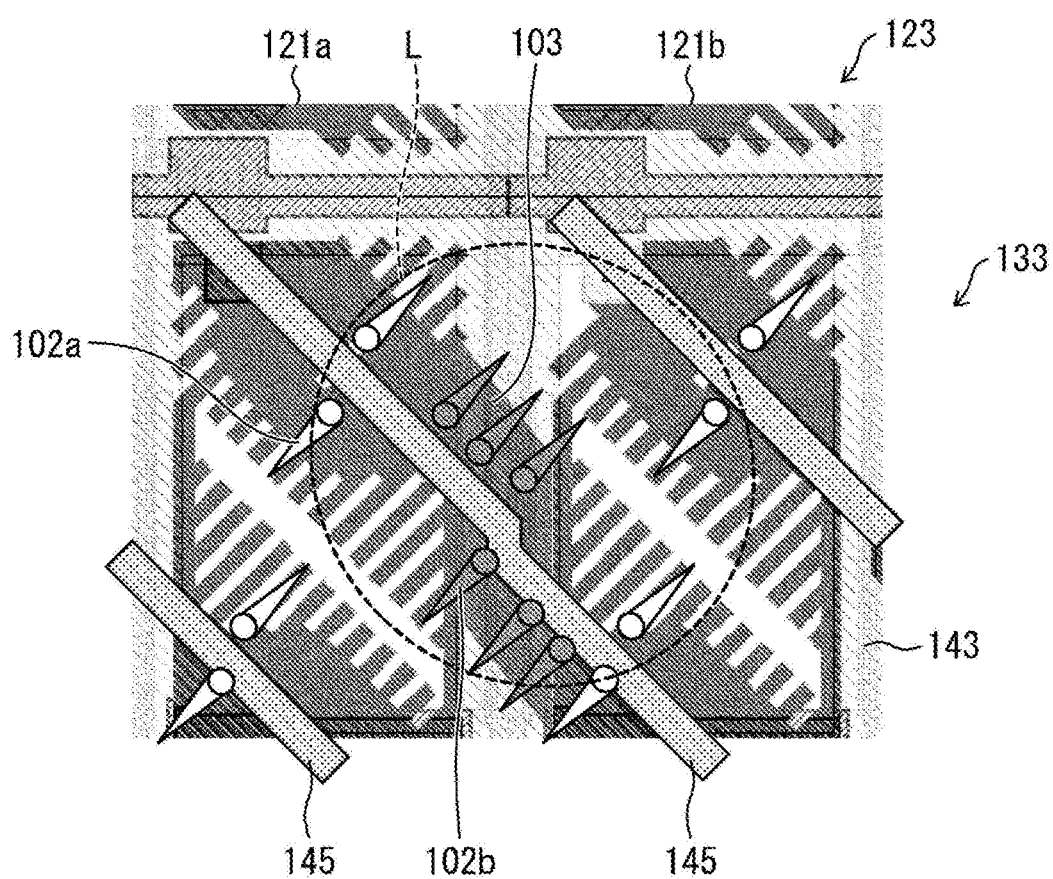
FIG. 13 is an enlarged view of a region L shown in FIG. 12 and a vicinity of the region L.

The liquid crystal display panel 133 has the structures 145 instead of the structures 143 included in the liquid crystal display panels 131 and 132. As shown in FIG. 11A and FIGS. 12 and 13 described later, although the interelectrode connection portion 103 is located below the structure 145, the interelectrode connection portion 103 has a width larger than the width of the structure 145, so that the interelectrode connection portion 103 runs off the structure 145. The structure 145 does not have the branch extension portion 143a, and the configuration of the structure 145 other than not having the branch extension portion 143a is the same as the configuration of the structure 143.

(Liquid Crystal Alignment Directions in Liquid Crystal Display Panel 133 and Advantages)

FIG. 12 is an explanatory diagram showing the liquid crystal alignment directions in the liquid crystal display panel 133. FIG. 13 is an enlarged view of a region L shown in FIG. 12 and a vicinity of the region L.

FIGS. 12 and 13 show a state where the liquid crystal alignment directions are changed from the state shown in FIG. 11A by forming the pixel electrode 121 by connecting the sub-pixel electrodes 121a to 121c by the interelectrode connection portions 103. In FIGS. 12 and 13, the alignment directions of the liquid crystal molecules 102a in a sub-pixel is indicated by white rods, and the alignment directions of the liquid crystal molecules 102b generated by providing the interelectrode connection portions 103 are indicated by gray rods.

In the liquid crystal display panel 133, the interelectrode connection portions 103 are provided in a central portion of a long side of the sub-pixel electrodes 121a to 121c, so that it is possible to realize a connection of the sub-pixel electrodes 121a to 121c, where boundaries of the liquid crystal alignment directions of sub-pixels adjacent to each other are connected. In this case, the interelectrode connection portion 103 is wider than the interelectrode connection portions 103 of the other embodiments.

Thereby, as shown in FIGS. 12 and 13, the liquid crystal alignment directions in the liquid crystal display panel 133 are hardly shifted from the liquid crystal alignment directions shown in FIG. 11A. In particular, in the present embodiment, the liquid crystal alignment directions are the same in the left and right sub-pixel regions of the interelectrode connection portion 103.

Specifically, in the liquid crystal display panel 133 having the relatively wide interelectrode connection portion 103, as shown in a region L in FIG. 13, the liquid crystal alignment directions are generally aligned to upper right or lower left in the sub-pixels on both sides of the interelectrode connection portion 103. On the other hand, in the liquid crystal display panel 131 having the relatively narrow interelectrode connection portion 103, as shown in a region G in FIG. 8, the liquid crystal alignment directions are generally not aligned to upper right or lower left in the sub-pixels on both sides of the interelectrode connection portion 103, and there is a portion where the liquid crystal alignment directions are different from those directions.

The reason why the liquid crystal alignment directions are aligned as described above in the liquid crystal display panel 133 is also because the structure 145 does not have the branch extension portion 143a between the sub-pixel electrodes 121a to 121c adjacent to each other. As a result, in the liquid crystal display panel 133, luminance degradation and display failure do not occur.

In the example of FIG. 13, while the most preferable state of the liquid crystal alignment directions can be realized, a region where bus lines and the pixel electrode 123 are overlapped increases. Therefore, it is predicted that effects of parasitic capacitance increase. Therefore, when manufacturing the liquid crystal display device without changing an existing TFT producing process condition, the configuration of the fourth embodiment where the configurations of the second and the third embodiments and a process condition of an insulating layer film thickness and the like are changed is preferred.

It is possible to apply the configuration of the interelectrode connection portion 103 described above to a liquid crystal display device of each reference embodiment including an interelectrode connection portion 34 described later.

Reference Embodiment 1

A reference embodiment of the present disclosure will be described below with reference to the drawings.

(Overview of Liquid Crystal Display Device 1)

Figure 14:
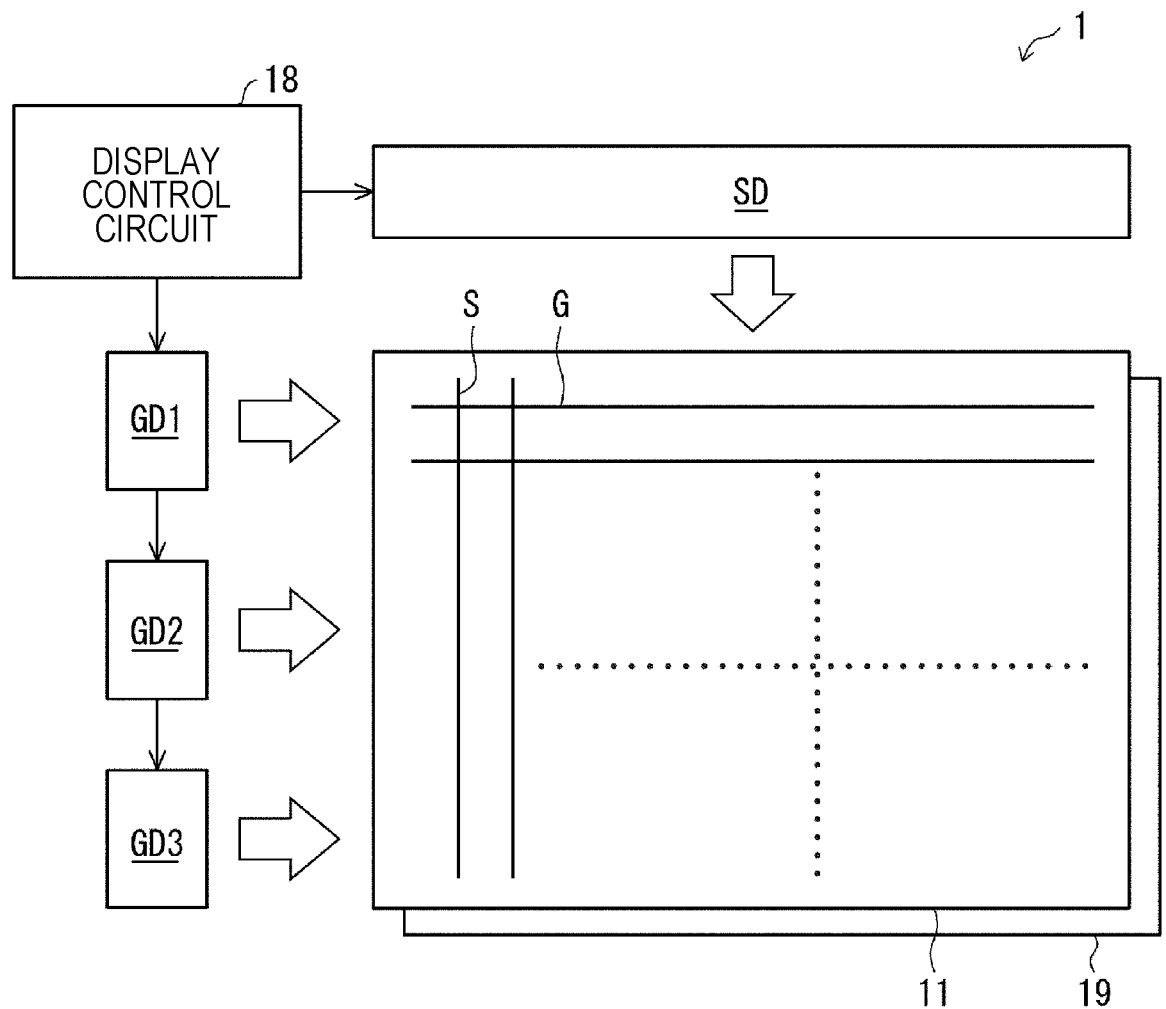
FIG. 14 is a schematic block diagram showing a liquid crystal display device of a reference embodiment to which a configuration of a liquid crystal display device of the embodiments of the present disclosure can be applied.
Figure 15:
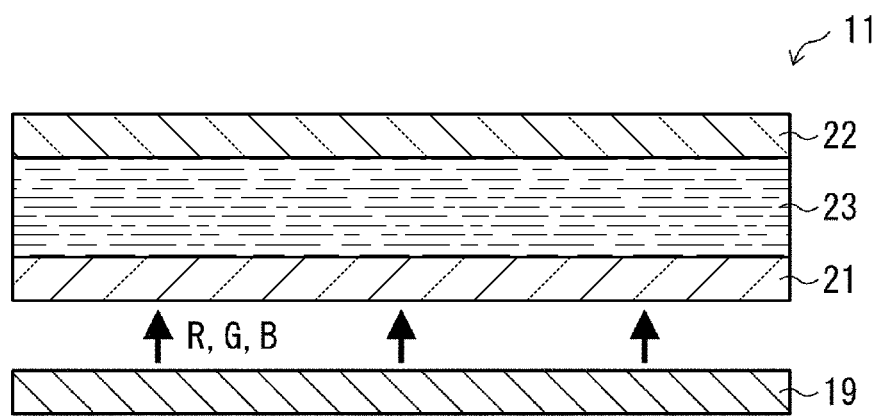
FIG. 15 is a schematic vertical cross-sectional view of a liquid crystal display panel included in the liquid crystal display device shown in FIG. 14.

FIG. 14 is a schematic block diagram showing a configuration of a liquid crystal display device of a reference embodiment. FIG. 15 is a schematic vertical cross-sectional view of a liquid crystal display panel included in the liquid crystal display device shown in FIG. 14.

As shown in FIG. 14, the liquid crystal display device 1 includes a liquid crystal display panel 11, a source driver SD, a gate driver GD (GD1 to GD3), a display control circuit 13, and a backlight device 19. As shown in FIG. 14x the gate driver GD is generally composed of a plurality of gate drivers GD (gate driver GD elements). In the example of FIG. 14, the gate driver GD is composed of three gate drivers GD1 to GD3. In this case, when a scan signal is sent from one gate driver GD to rows from the first to the last, information indicating it is transmitted to the next stage gate driver GD, and the next stage gate driver GD sends a scan signal in the same manner.

The liquid crystal display panel 11 has source signal lines S and gate signal lines G provided in a matrix form. As shown in FIG. 15, in the liquid crystal display panel 11, a TFT substrate (active matrix substrate) 21 and a counter substrate 22 are arranged facing each other, and a liquid crystal layer 23 is provided between the TFT substrate 21 and the counter substrate 22.

The source driver SD drives the source signal lines S of the liquid crystal display panel 11, and the gate driver GD drives the gate signal lines G of the liquid crystal display panel 11. The display control circuit 18 outputs a control signal instructing the gate driver GD to scan the gate signal lines G and outputs a clock signal, a start pulse, video data, and the like to the source driver SD based on a control signal and display data supplied from outside.

The start pulse outputted from the display control circuit 18 is inputted into only the gate driver GD1. Thereafter, the start pulse is inputted into the gate driver GD2 from the gate driver GD1, and inputted into the gate driver GD3 from the gate driver GD2.

The backlight device 19 irradiates the liquid crystal display panel 11 with light from backside of the liquid crystal display panel 11 while switching red, green, and blue of light. Although the backlight device 19 may irradiates the liquid crystal display panel 11 with light while switching white light in addition to red, green, and blue of light, the backlight device 19 irradiates the liquid crystal display panel 11 with light while switching at least red, green, and blue of light. In the description below, for convenience of description, the backlight device 19 shall irradiate the liquid crystal display panel 11 with light while switching red, green, and blue of light.

(Configuration of Liquid Crystal Display Panel 11)

Figure 16:
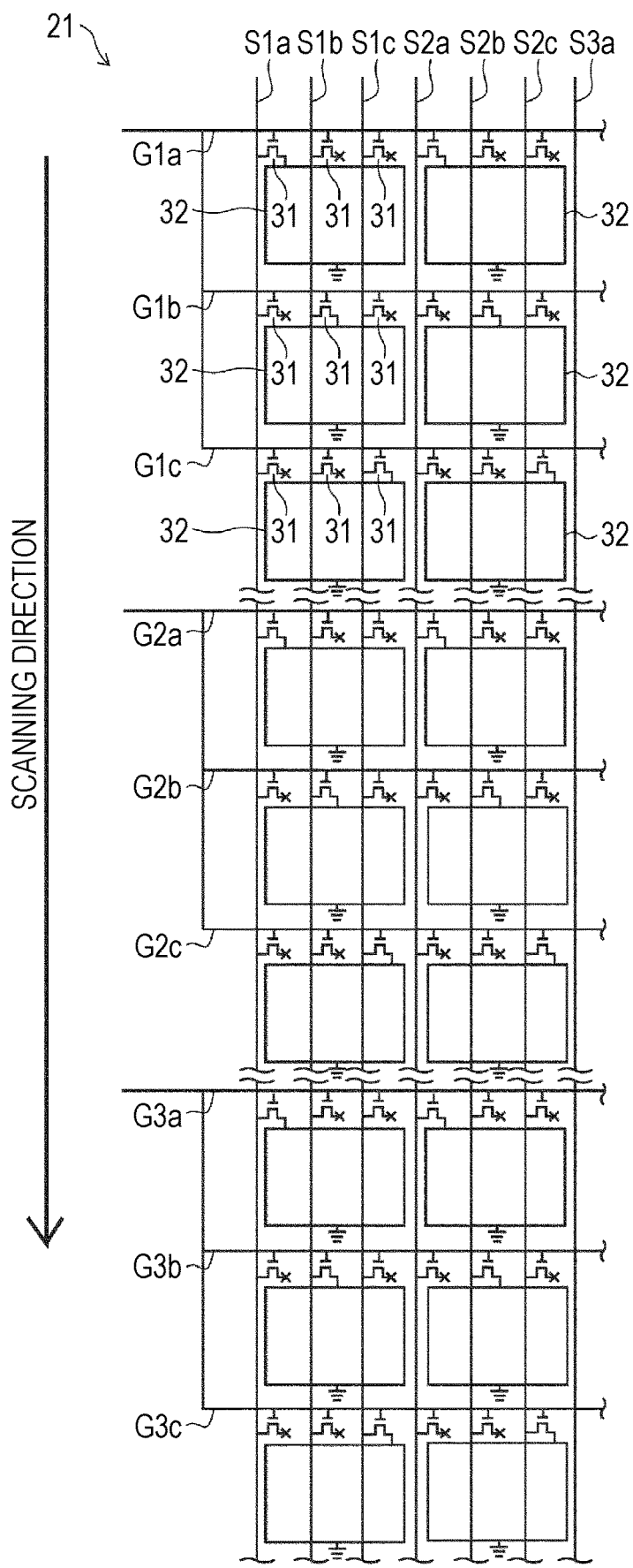
FIG. 16 is a schematic circuit diagram showing a configuration of a TFT substrate shown in FIG. 15.

FIG. 16 is a schematic circuit diagram showing a configuration of the TFT substrate 21 shown in FIG. 15. The TFT substrate 21 is designed by using a design of a conventional TFT substrate of a liquid crystal display panel including a color filter. In the conventional TFT substrate, each pixel included in each row is divided into three sub-pixels for red, green, and blue.

The TFT substrate 21 has source signal lines S1a to S1c, S2a to S2c, and so on, which are first to third source signal lines corresponding to the three sub-pixels for red, green, and blue, respectively.

In the TFT substrate 21, the gate signal lines G1a, G1b, and G1c, and so on, which are scanned by the gate driver GD1, are connected together so that the continuous three gate signal lines G1a to G1c, and so on are scanned at the same time by the gate driver GD1. The same goes for the gate signal lines G2a, G2b, and G2c, and so on, which are scanned by the gate driver GD2, are connected together, and the gate signal lines G3a, G3b, and G3c, and so on, which are scanned by the gate driver GD3. That is, the gate signal lines G2a to G2c, and so on are connected together, and in the same way, the gate signal lines G3a to G3c, and so on are connected together.

Here, the number of gate signal lines G that are driven at the same time is three. However, it is needless to say that two or more gate signal lines G can be driven by the same principle.

The TFT substrate 21 has one pixel electrode 32, which covers a region of the three sub-pixels, for each three sub-pixels. Further, the TFT substrate 21 has a TFT (switching element) 31 for each three sub-pixels, that is, the first to the third source signal lines.

Next, a connection relationship between the source signal lines S, the TFTs 31, and the pixel electrodes 32 in continuous three rows will be described using the pixel electrodes 32 in a first column on the left side as an example. Among the continuous three rows, in the first row, only the source signal line S1a of the source signal lines S1a to S1c is connected to the pixel electrode 32 through the TFT 31, in the second row, only the source signal line S1b is connected to the pixel electrode 32 through the TFT 31, and in the third row, only the source signal line S1c is connected to the pixel electrode 32 through the TFT 31. In FIG. 16, a x mark shown on the TFT 31 indicates a state where the TFT 31 is not connected to the pixel electrode 32 (non-contact state).

(Substantial Configuration of TFT substrate 21)

Figure 17:
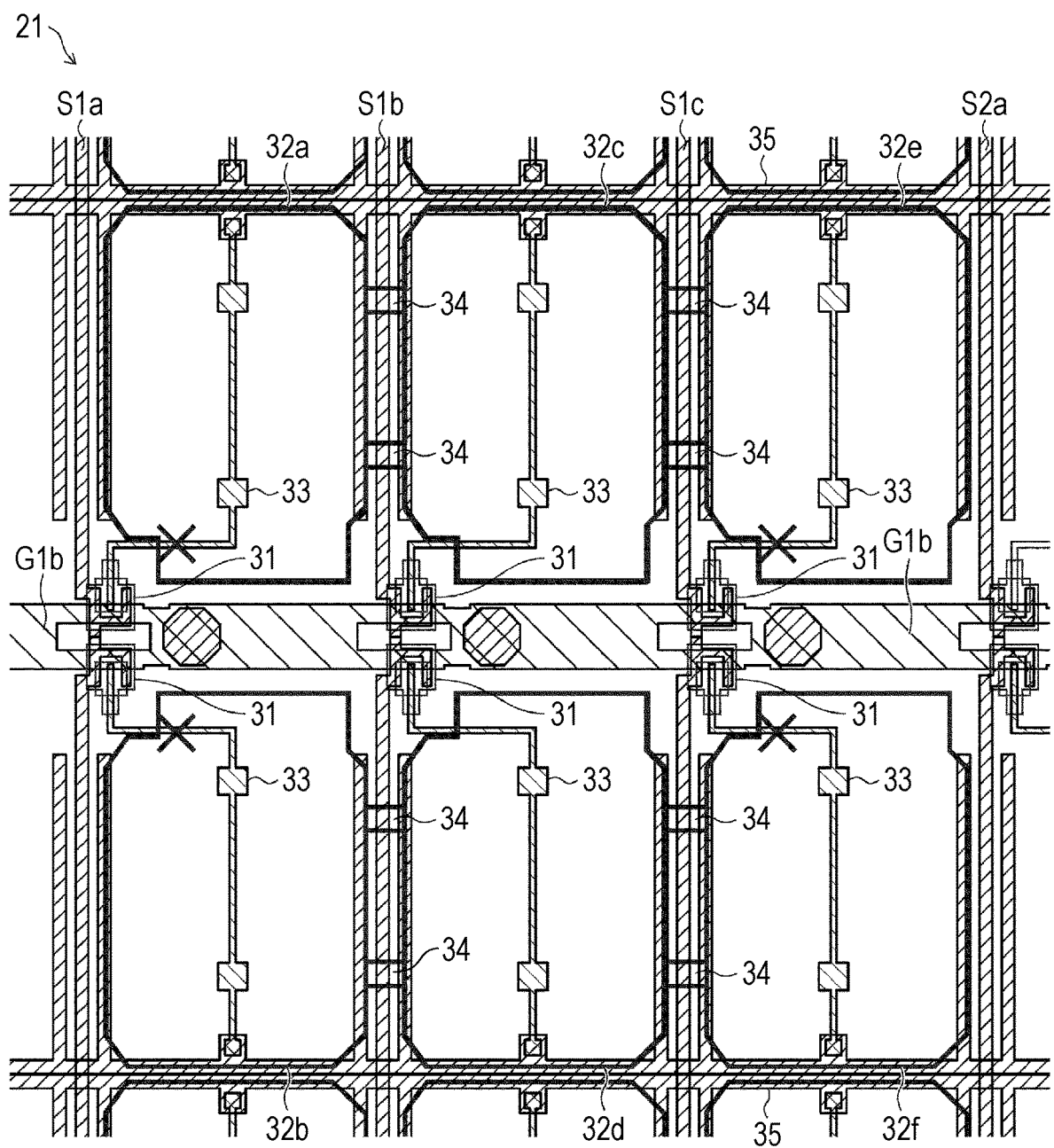
FIG. 17 is a plan view showing an example of a substantial configuration of the TFT substrate shown in FIG. 16.
Figure 18:
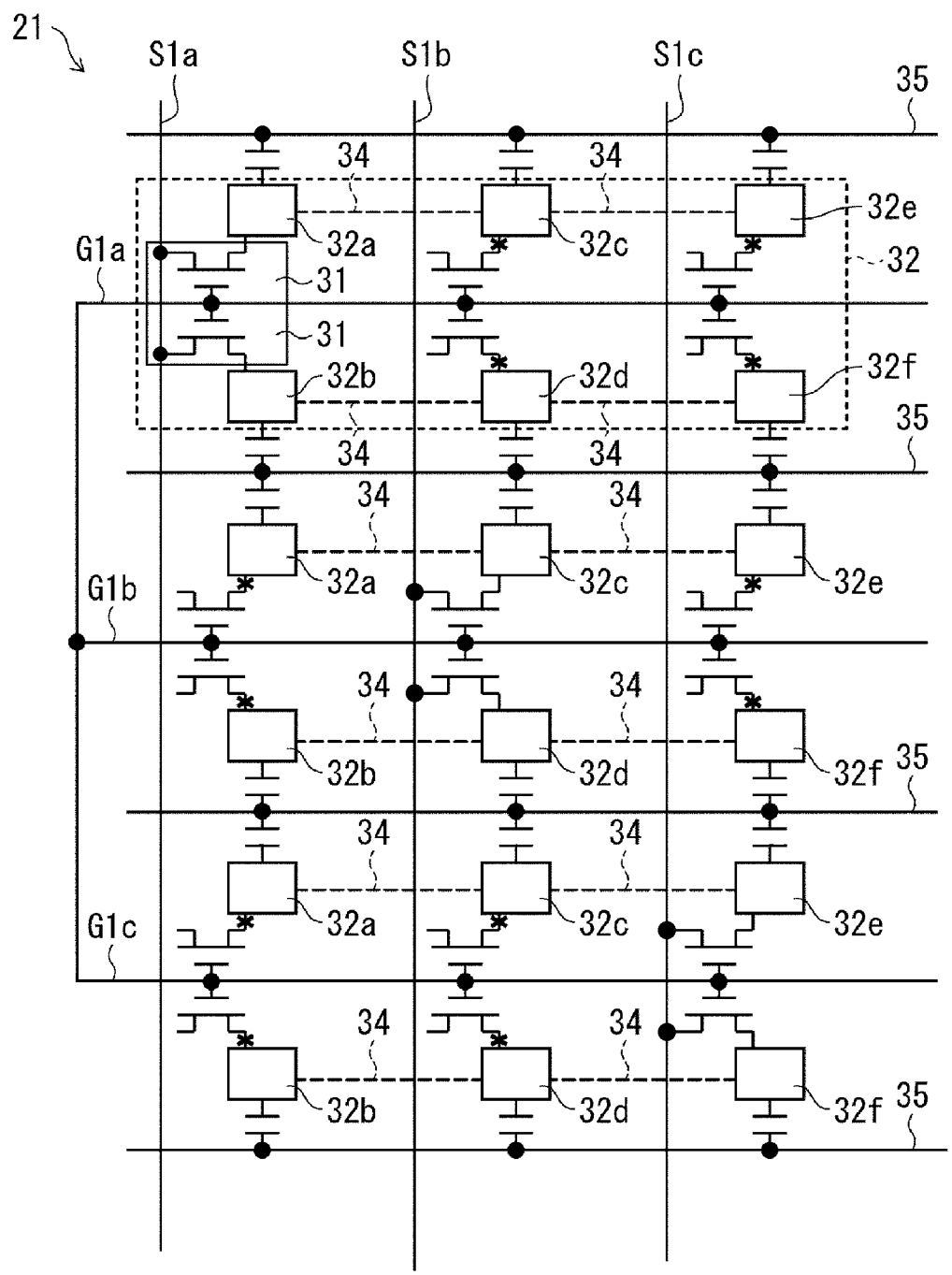
FIG. 18 is a circuit diagram corresponding to the circuit diagram of the TFT substrate shown in FIG. 16 appropriate for the configuration shown in FIG. 17.

Next, a substantial configuration of the TFT substrate 21 shown in FIG. 16 will be described with reference to FIG. 17. FIG. 17 is a plan view showing an example of the substantial configuration of the TFT substrate 21 shown in FIG. 16. FIG. 18 is a circuit diagram corresponding to the circuit diagram of the TFT substrate 21 shown in FIG. 16 appropriate for the configuration shown in FIG. 17. The configuration shown in FIG. 17 corresponds to a portion of the pixel electrode 32 in the second row in the left side column in FIG. 16.

As shown in FIG. 17, the TFT substrate 21 has ITO (Indium Tin Oxide) electrodes 32a to 32f that constitute the pixel electrode 32. In other words, the six ITO electrodes (sub-pixel electrodes) 32a to 32f constitutes one pixel (one pixel electrode 32) in time division driving of the liquid crystal display device 1. The two vertical ITO electrodes 32a and 32b on the left side correspond to a red sub-pixel of the conventional TFT substrate, the two vertical ITO electrodes 32c and 32d in the center correspond to a green sub-pixel of the conventional TFT substrate, and the two vertical ITO electrodes 32e and 32f on the right side correspond to a blue sub-pixel of the conventional TFT substrate.

The ITO electrode 32c is connected to each of the left ITO electrode 32a and the right ITO electrode 32e through two interelectrode connection portions 34. The interelectrode connection portions 34 straddle over the source signal lines S1b and S1c (cross the source signal lines S1b and S1c in a non-contact state). The interelectrode connection portion 34 is provided at two locations, so that the yield of the TFT substrate 21 is improved. The interelectrode connection portions 34 are provided in only partial regions between the ITO electrode 32c and the ITO electrode 32a and between the ITO electrode 32c and the ITO electrode 32e. Thereby, an overlap between the pixel electrode 32 and the source signal lines S1b and S1c is suppressed to minimum.

It is desirable that the area where the pixel electrode 32, that is, the interelectrode connection portions 34, and the source signal lines (the source signal lines S1b and S1c) are overlapped is small as much as possible as described above. This is to suppress variation of the potential of the source signals, that is, variation of the potential of the pixel electrode 32, by capacitive coupling between the pixel electrode 32 and the source signal lines (the source signal lines S1b and S1c).

It is possible to apply the configuration where the ITO electrodes adjacent to each other are connected by the interelectrode connection portions 34 to liquid crystal display devices of all the other reference embodiments in the same manner.

The ITO electrode 32d is connected to the left ITO electrode 32b and the right ITO electrode 32f in the same manner.

The TFT 31 and the pixel electrode 32 are connected by contact holes 33. In the example shown in FIG. 17, only the ITO electrodes 32c and 32d are connected to the TFT 31, and the ITO electrodes 32a and 32b and the ITO electrodes 32e and 32f are not connected to the TFT 31. In this state, a signal of the source signal line S (source signal line S1b) is given from the TFTs 31 corresponding to the ITO electrodes 32c and 32d to the ITO electrodes 32c and 32d. Reference numeral 35 denotes a CS line.

In the example of FIG. 17, the non-contact state between the TFT 31 and the pixel electrode 32 is realized by disconnecting the source electrode (or the drain electrode) of the TFT 31 between the TFT 31 and the contact hole 33 (x mark in FIG. 17). In this case, it is possible to easily deal with the presence or absence of voltage application to the ITO electrode by only changing a pattern of the source electrode (or the drain electrode). The TFT 31 and the pixel electrode 32 may be disconnected by removing a pattern of the ITO electrode to be disconnected to the TFT 31.

Next, a connection relationship between the source signal lines S, the gate signal lines G, the TFTs 31, and the ITO electrodes (sub-pixel electrodes) 32 described above will be described in detail with reference to FIG. 18.

As shown in FIG. 18, in the TFT substrate 21 using a conventional design, the TFT 31 is formed in all the sub-electrodes.

Among the TFTs 31 connected to the gate signal line G1a, two TFTs 31 originally intended to transmit the signal of the source signal line S1a to the ITO electrodes (sub-pixel electrodes) 32a and 32b achieve the original intension (are used according to the original intention). That is, regarding the two TFTs 31, the source electrode is connected to the source signal line S1a, and the drain electrode is connected to the ITO electrode 32a or 32b.

On the other hand, among the TFTs 31 connected to the gate signal line G1a, two TFTs 31 originally intended to transmit the signal of the source signal line S1b to the ITO electrodes (sub-pixel electrodes) 32c and 32d and two TFTs 31 originally intended to transmit the signal of the source signal line S1c to the ITO electrodes (sub-pixel electrodes) 32e and 32f do not achieve the original intension (are not used according to the original intention). That is, regarding the two TFTs 31 originally intended to transmit the signal of the source signal line S1b to the ITO electrodes (sub-pixel electrodes) 32c and 32d, the source electrode is disconnected from the source signal line S1b, and the drain electrode is disconnected from the ITO electrode 32c or 32d. Similarly, regarding the two TFTs 31 originally intended to transmit the signal of the source signal line S1c to the ITO electrodes (sub-pixel electrodes) 32e and 32f, the source electrode is disconnected from the source signal line S1c, and the drain electrode is disconnected from the ITO electrode 32e or 32f.

Among the TFTs 31 connected to the gate signal line G1b, two TFTs 31 originally intended to transmit the signal of the source signal line S1b to the ITO electrodes (sub-pixel electrodes) 32c and 32d achieve the original intension (are used according to the original intention). The state of the two TFTs 31 corresponding to the ITO electrodes 32c and 32d in this case is the same as the state of the above two TFTs 31 corresponding to the ITO electrodes 32a and 32b among the TFTs 31 connected to the gate signal line G1a.

On the other hand, among the TFTs 31 connected to the gate signal line G1b, two TFTs 31 originally intended to transmit the signal of the source signal line S1a to the ITO electrodes 32a and 32b and two TFTs 31 originally intended to transmit the signal of the source signal line S1c to the ITO electrodes 32e and 32f do not achieve the original intension (are not used according to the original intention). The states of the two TFTs 31 corresponding to the ITO electrodes 32a and 32b and the two TFTs 31 corresponding to the ITO electrodes 32e and 32f are the same as the state of, for example, the above two TFTs 31 corresponding to, for example, the ITO electrodes 32c and 32d among the TFTs 31 connected to the gate signal line G1a.

Among the TFTs 31 connected to the gate signal line G1c, two TFTs 31 originally intended to transmit the signal of the source signal line S1c to the ITO electrodes (sub-pixel electrodes) 32e and 32f achieve the original intension (are used according to the original intention). The state of the two TFTs 31 corresponding to the ITO electrodes 32e and 32f in this case is the same as the state of the above two TFTs 31 corresponding to the ITO electrodes 32a and 32b among the TFTs 31 connected to the gate signal line G1a.

On the other hand, among the TFTs 31 connected to the gate signal line G1c, two TFTs 31 originally intended to transmit the signal of the source signal line S1a to the ITO electrodes 32a and 32b and two TFTs 31 originally intended to transmit the signal of the source signal line S1b to the ITO electrodes 32c and 32d do not achieve the original intension (are not used according to the original intention). The state of the two TFTs 31 corresponding to the ITO electrodes 32a and 32b and the state of the two TFTs 31 corresponding to the ITO electrodes 32c and 32d in this case is the same as the state of, for example, the above two TFTs 31 corresponding to the ITO electrodes 32c and 32d among the TFTs 31 connected to the gate signal line G1a.

in the TFT substrate 21, the connection relationship between the source signal lines S, the gate signal lines G, the TFTs 31, and the ITO electrodes 32 as described above is repeated.

(Operation and Advantages of Liquid Crystal Display Device 1)

In the configuration described above, the liquid crystal display device 1 performs the same operation as that of a conventional time-division drive type liquid crystal display device which performs color display where the backlight device 19 emits RGB light in time division manner. Specifically, in the liquid crystal display device 1, the backlight device 19 emits RGB light to an entire screen in time division manner, and the liquid crystal display device 1 performs color display by switching display of the liquid crystal display panel 11 in synchronization with the emission of the RGB light.

The liquid crystal display device 1 uses a design of an existing liquid crystal display panel that uses a color filter, in particular, a design of a pixel portion. Therefore, in the liquid crystal display device 1, for example, it is required to change only a design of an ITO electrode for applying a voltage in a pixel region. By doing so, regarding the liquid crystal display device 1, it is possible to save design resources, reduce the number of masks whose design will be changed, and reduce design cost. As a result, the liquid crystal display device 1 can be manufactured at low cost. Of course, it is needless to say that the liquid crystal display device 1 can be newly designed if the structure is the same.

In the present reference embodiment, a case is shown where one unit gate signal line is formed by connecting together three gate signal lines G, and a gate voltage is applied from the gate driver GD for each one unit gate signal line. However, the one unit gate signal line may be formed by connecting together m (m≥2) gate signal lines.

Reference Embodiment 2

Another reference embodiment of the present disclosure will be described with reference to the drawings. For convenience of description, members that have the same functions as those of the members described in the above reference embodiment will be denoted by the same reference numerals, and descriptions thereof will be omitted.

(Overview of Liquid Crystal Display Device 2)

Figure 19:
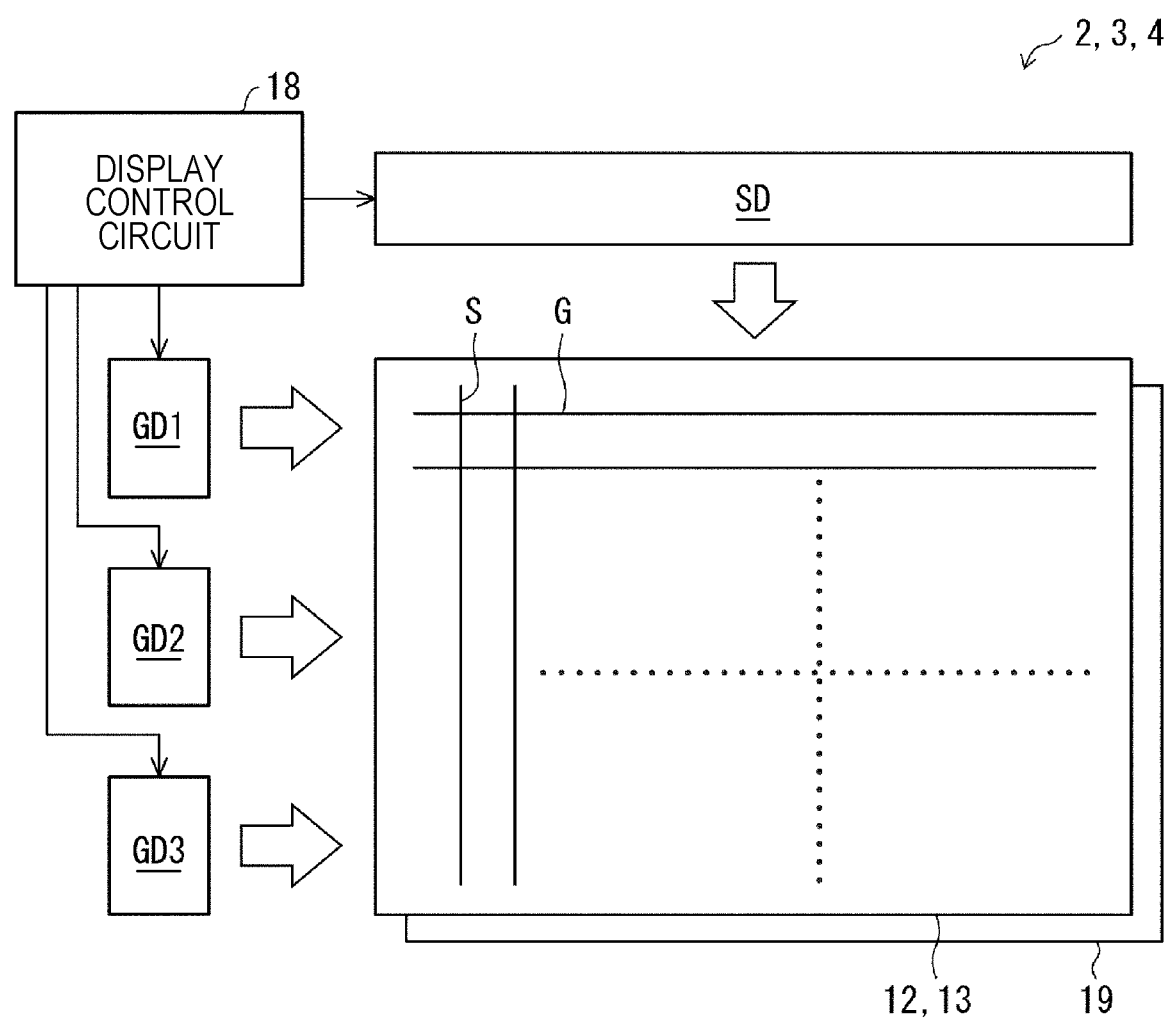
FIG. 19 is a schematic block diagram showing a configuration of a liquid crystal display device of another reference embodiment to which a configuration of a liquid crystal display device of the embodiments of the present disclosure can be applied.

FIG. 19 is a schematic block diagram showing a configuration of a liquid crystal display device 2 of the present reference embodiment. As shown in FIG. 19, the liquid crystal display device 2 includes a liquid crystal display panel 12 instead of the liquid crystal display panel 11 of the liquid crystal display device 1.

In the liquid crystal display device 1 described above, the start pulse outputted from the display control circuit 18 is inputted into only the gate driver GD1, and thereafter the start pulse is inputted into the gate driver GD2 from the gate driver GD1 and then inputted into the gate driver GD3 from the gate driver GD2. On the other hand, in the liquid crystal display device 2, the start pulse outputted from the display control circuit 18 is inputted into each of the gate drivers GD1 to GD3.

(Configuration of Liquid Crystal Display Panel 12)

Figure 20:
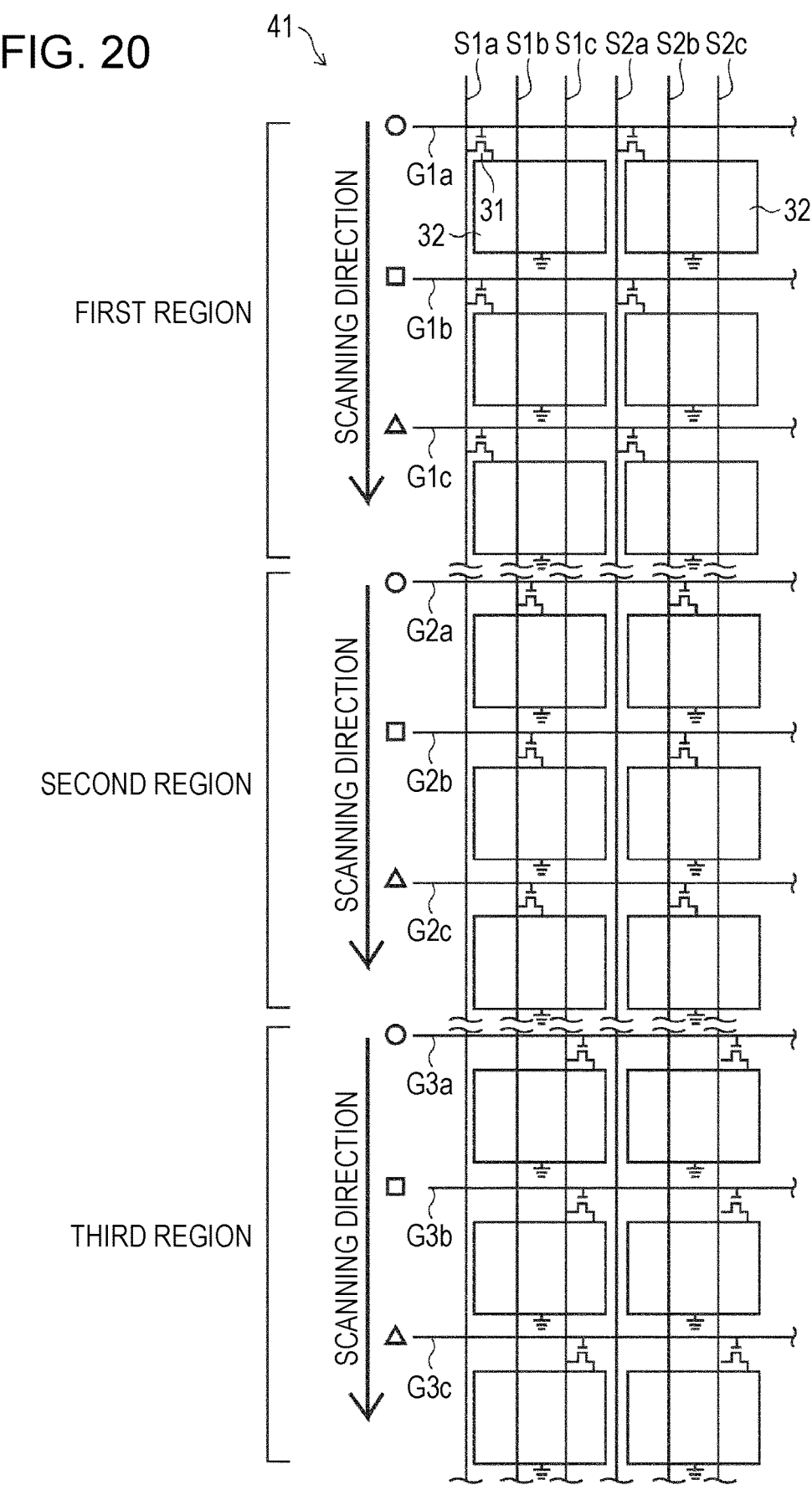
FIG. 20 is a schematic circuit diagram showing a configuration of a TFT substrate included in a liquid crystal display panel shown in FIG. 19.

FIG. 20 is a schematic circuit diagram showing a configuration of a TFT substrate 41 included in the liquid crystal display panel 12. The TFT substrate (active matrix substrate) 41 is designed by using a design of a conventional TFT substrate of a liquid crystal display panel including a color filter in the same manner as the TFT substrate 21.

However, in the TFT substrate 41, as shown in FIG. 20, the TFT 31 is not formed for each sub-pixel, but only the TFT 31 that applies a voltage to the pixel electrode 32 composed of a plurality of sub-pixels is formed. In this case, regarding the TFT 31 that is formed for each sub-pixel by using a design of a conventional TFT substrate, only necessary TFTs 31 are left, and unnecessary TFTs 31 are removed by etching. That is, the TFT substrate 41 having such a configuration can use a design of a conventional TFT substrate (a conventional pixel design and/or a conventional TFT design). In the conventional TFT substrate, each pixel included in each row is divided into three sub-pixels for red, green, and blue.

In the same manner as the TFT substrate 21, the TFT substrate 41 has source signal lines S1a to S1c, S2a to S2c, and so on, which are first to third source signal lines corresponding to the three sub-pixels for red, green, and blue, respectively.

In the same manner as the TFT substrate 21, the TFT substrate 41 has one pixel electrode 32, which covers a region of the three sub-pixels, for each three sub-pixels.

Different from the TFT substrate 21, the TFT substrate 41 has gate signal lines G1a to G1c, and so on, in upper one third region (hereinafter referred to as a first region) of a screen of the liquid crystal display panel 12, gate signal lines G2a to G2c, and so on, in middle one third region (hereinafter referred to as a second region) of the screen of the liquid crystal display panel 12, and gate signal lines G3a to G3c, and so on, in lower one third region (hereinafter referred to as a third region) of the screen of the liquid crystal display panel 12.

In the liquid crystal display panel 12, the gate signal lines G1a to G1c, and so on, in the first region are driven by the gate driver GD1, the gate signal lines G2a to G2c, and so on, in the second region are driven by the gate driver GD2, and the gate signal lines G3a to G3c, and so on, in the third region are driven by the gate driver GD3. Scanning directions of the gate signal lines G in the first to the third regions are a direction from top to bottom of the screen. In this case, the scanning operations on the gate signal lines G performed by the gate drivers GD1 to GD3 are started at the same time and performed in parallel.

Next, a connection relationship between the source signal lines S, the TFTs 31, and the pixel electrodes 32 in the first to the third regions will be described using the pixel electrodes 32 in the first column on the left side as an example.

In the first region, only the source signal line S1a of the source signal lines S1a to S1c is connected to the pixel electrode 32 through the TFT 31, in the second region, only the source signal line S1b is connected to the pixel electrode 32 through the TFT 31, and in the third region, only the source signal line S1c is connected to the pixel electrode 32 through the TFT 31.

(Substantial Configuration of TFT substrate 41)

Figure 21:
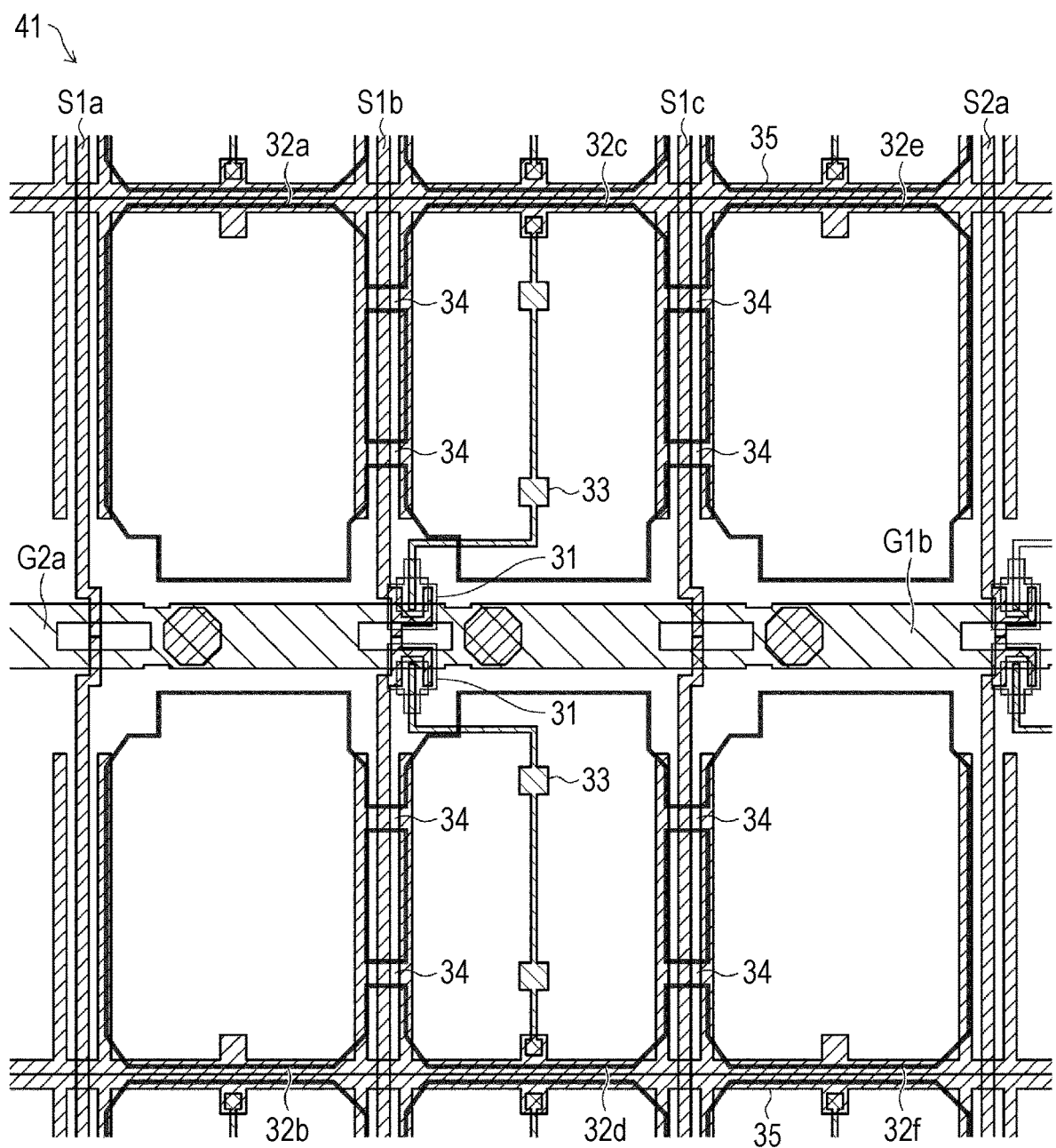
FIG. 21 is a plan view showing an example of a substantial configuration of the TFT substrate shown in FIG. 20.
Figure 22:
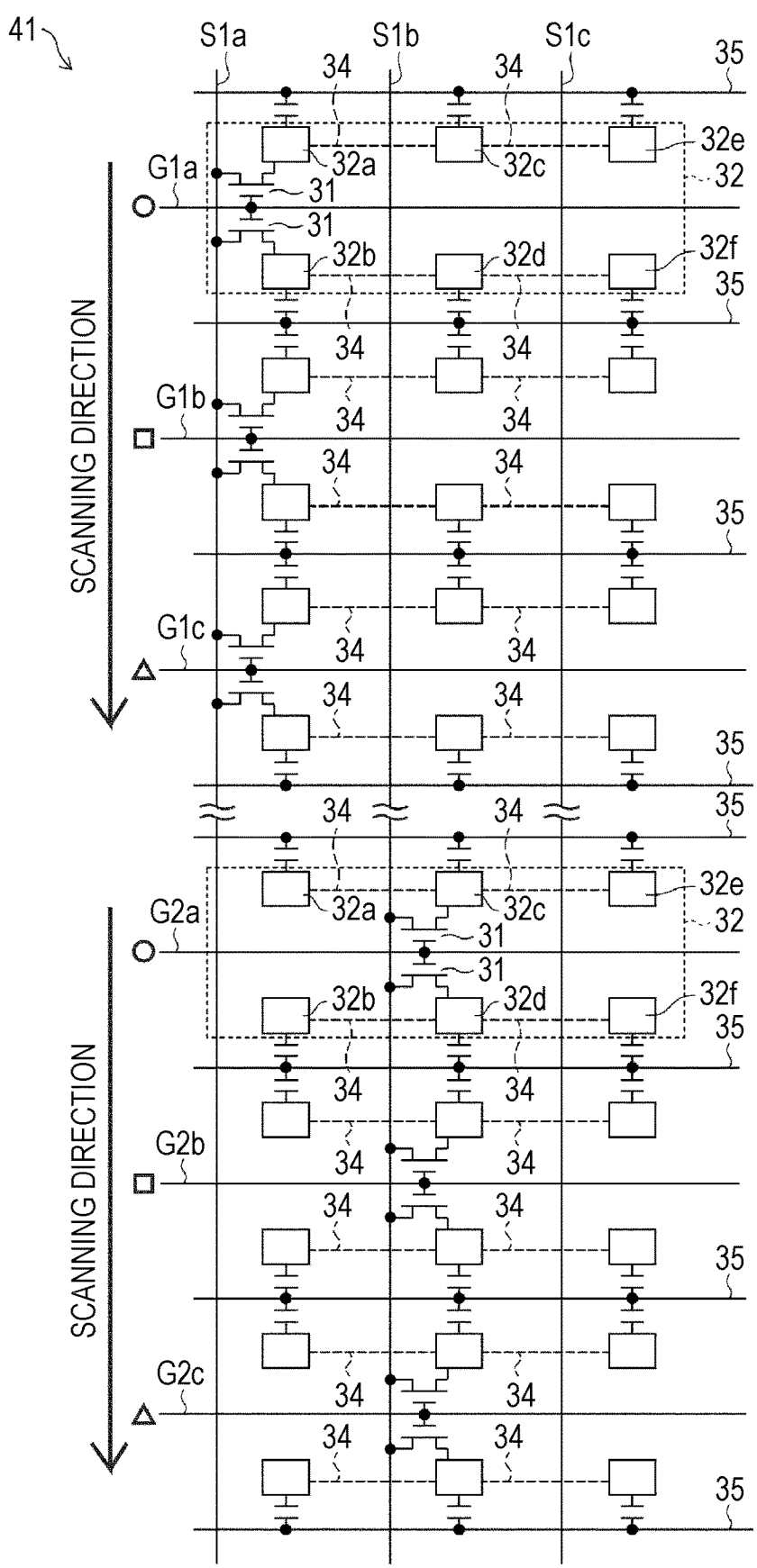
FIG. 22 is a circuit diagram corresponding to the circuit diagram of the TFT substrate shown in FIG. 20 appropriate for the configuration shown in FIG. 21.

Next, a substantial configuration of the TFT substrate 41 shown in FIG. 20 will be described with reference to FIG. 21. FIG. 21 is a plan view showing an example of the substantial configuration of the TFT substrate 41 shown in FIG. 20. FIG. 22 is a circuit diagram corresponding to the circuit diagram of the TFT substrate 41 shown in FIG. 20 appropriate for the configuration shown in FIG. 21. The configuration shown in FIG. 21 corresponds to a portion of the pixel electrode 32 in the first row in the left side column of the second region in FIG. 20.

As shown in FIG. 21, the TFT substrate 41 has the ITO electrodes 32a to 32f that constitutes one pixel electrode 32 in the same manner as the TFT substrate 21. The configuration of the pixel electrode 32 is the same as that of the TFT substrate 21. The TFT 31 and the pixel electrode 32 are connected by the contact holes 33.

Figure 23A:
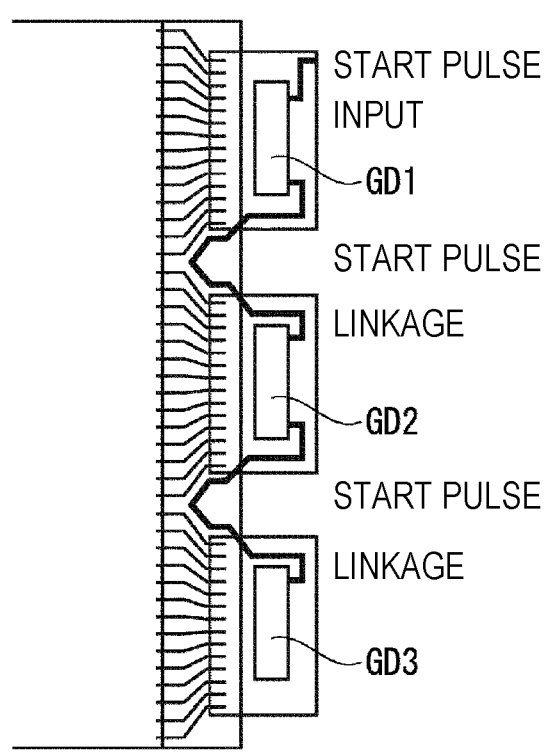
FIG. 23A is an explanatory diagram showing a configuration of a connection portion between gate drivers and a liquid crystal display panel using COF in a conventional liquid crystal display device using CF.
Figure 23B:
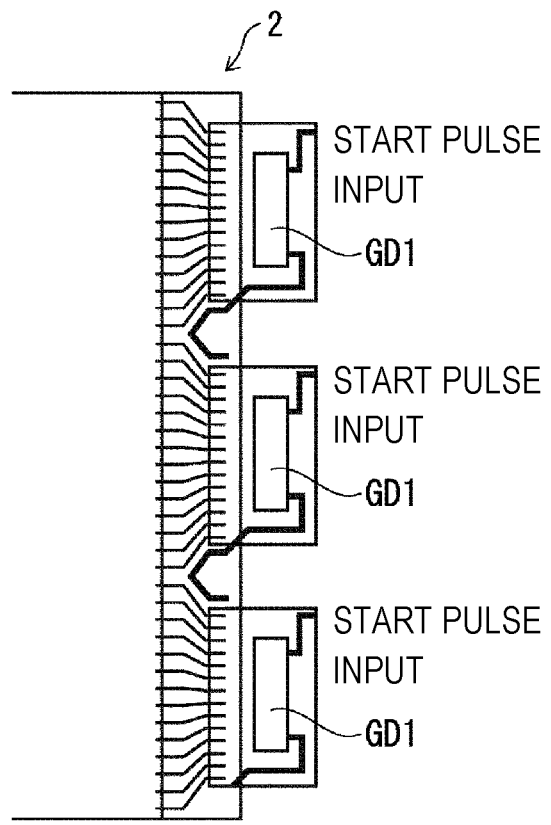
FIG. 23B is an explanatory diagram showing a configuration of a connection portion between gate drivers and a liquid crystal display panel using COF in the liquid crystal display device shown in FIG. 19.

Next, a configuration of a connection portion between gate drivers GD1 to GD3 using COF (Chip On Film) and the liquid crystal display panel 12 will be described. FIG. 23A is an explanatory diagram showing a configuration of the connection portion between the gate drivers GD1 to GD3 and a liquid crystal display panel using COF in a conventional liquid crystal display device using CF. FIG. 23B is an explanatory diagram showing a configuration of a connection portion between the gate drivers GD1 to GD3 and a liquid crystal display panel using COF in the liquid crystal display device shown in FIG. 19.

As shown in FIG. 23A, in the conventional liquid crystal display device using CF, scanning is sequentially performed from the first line to the last line. That is, when the start pulse is inputted from the display control circuit 18 to the gate driver GD1, the gate driver GD1 starts scanning. When the gate driver GD1 ends the scanning, the gate driver GD1 outputs a signal for starting scanning to the gate driver GD2. Thereby, the gate driver GD2 starts scanning. When the gate driver GD2 ends the scanning, the gate driver GD3 starts scanning in the same manner.

On the other hand, in the liquid crystal display device 2 of the present reference embodiment, the gate drivers GD1 to GD3 scan the first to the third regions in parallel at the same time by using the COF included in the conventional liquid crystal display device or a design of the COF. Specifically, the start pulse is inputted into the gate drivers GD1 to GD3 at the same time from the display control circuit 18 (see FIG. 23B). Regarding the film of COF, connection between the film of the first COF and the film, of the second COF is disconnected and connection between the film of the second COF and the film of the third COF is disconnected, so that these films are independent films. Of course, it is needless to say that it is possible to newly design a COF film having a similar function without being limited to the above configuration.

(Operation and Advantages of Liquid Crystal Display Device 2)

In the above configuration, the liquid crystal display device 2 performs color display where the backlight device 19 emits RGB light in time division manner in the same manner as the liquid crystal display device 1.

In the liquid crystal display device 2, the screen is divided into first to third regions in a vertical direction and these regions are scanned in parallel by individual gate drivers GD1 to GD3, respectively. Therefore, while the liquid crystal display device 2 is driven at 180 Hz and one frame time is 5.3 ms, the number of lines where each source signal line S writes is one third. Thereby, a writing time for one source signal line S can be 60 Hz in the same manner as in the case of 60 Hz drive, so that it is possible to sufficiently charge electric charges to the liquid crystal layer 23.

Here, a time for completing a response of liquid crystal is appropriately provided before emitting each light of red, green, and blue.

Each output terminal of the gate drivers GD1 to GD3 (for example, each of 256 output terminals included in each gate driver GD1 to GD3) applies a voltage to only one gate signal line G and supplies current to the gate signal line G. Such a relationship between the gate drivers GD1 to GD3 and the gate signal lines G is the same as that of a conventional CF type liquid crystal display device driven at 60 Hz.

That is, a load of each gate driver GD1 to GD3 is, for example, one third of a load of each gate driver GD1 to GD3 of the liquid crystal display device 1 (see FIG. 14) having the TFT substrate 21 (see FIG. 16).

Therefore, in the liquid crystal display device 2 of the present reference embodiment, the load of each gate driver GD1 to GD3 is light in the same manner as in the conventional CF type liquid crystal display device driven at 60 Hz. Thereby, an existing gate driver driven at 60 Hz can be used for each gate driver GD1 to GD3.

An existing design rule can be used for peripherals of the gate drivers GD1 to GD3, and no new design is required. Therefore, it is possible to realize a large transparent type liquid crystal display panel 12 at low cost and minimum modification man-hours by using a design of an existing TV set and only slightly correcting the design.

In the same manner as the liquid crystal display device 1, the liquid crystal display device 2 of the present reference embodiment uses a design of an existing liquid crystal display panel that uses a color filter, in particular, a design of a pixel portion. Therefore, for the liquid crystal display device 2, it is required to perform only a design change where only TFTs 31 that are necessary to apply a voltage are left and the other TFTs are removed. Thereby, regarding the liquid crystal display device 2, it is possible to save design resources, reduce the number of masks whose design will be changed, and reduce design cost, although man-hours are required to delete TFTs 31. As a result, the liquid crystal display device 2 can be manufactured at low cost.

In the present reference embodiment, a case is described where the screen of the liquid crystal display panel 12 is divided into three regions, that is, first to third regions. However, the division of the screen of the liquid crystal display panel 12 is not limited to this, but the screen may be divided into n regions (n≥2). The same goes for the other reference embodiment described below.

Reference Embodiment 3

Further another reference embodiment of the present disclosure will be described with reference to the drawings. For convenience of description, members that have the same functions as those of the members described in the above reference embodiments will be denoted by the same reference numerals, and descriptions thereof will be omitted.

(Overview of Liquid Crystal Display Device 4)

The liquid crystal display device 4 (see FIG. 19) of the present reference embodiment includes the same liquid crystal display panel 12 (TFT substrate 41) as the liquid crystal display panel 12 (TFT substrate 41) of the liquid crystal display device 2.

(Configuration of Liquid Crystal Display Device 4)

Figure 24:
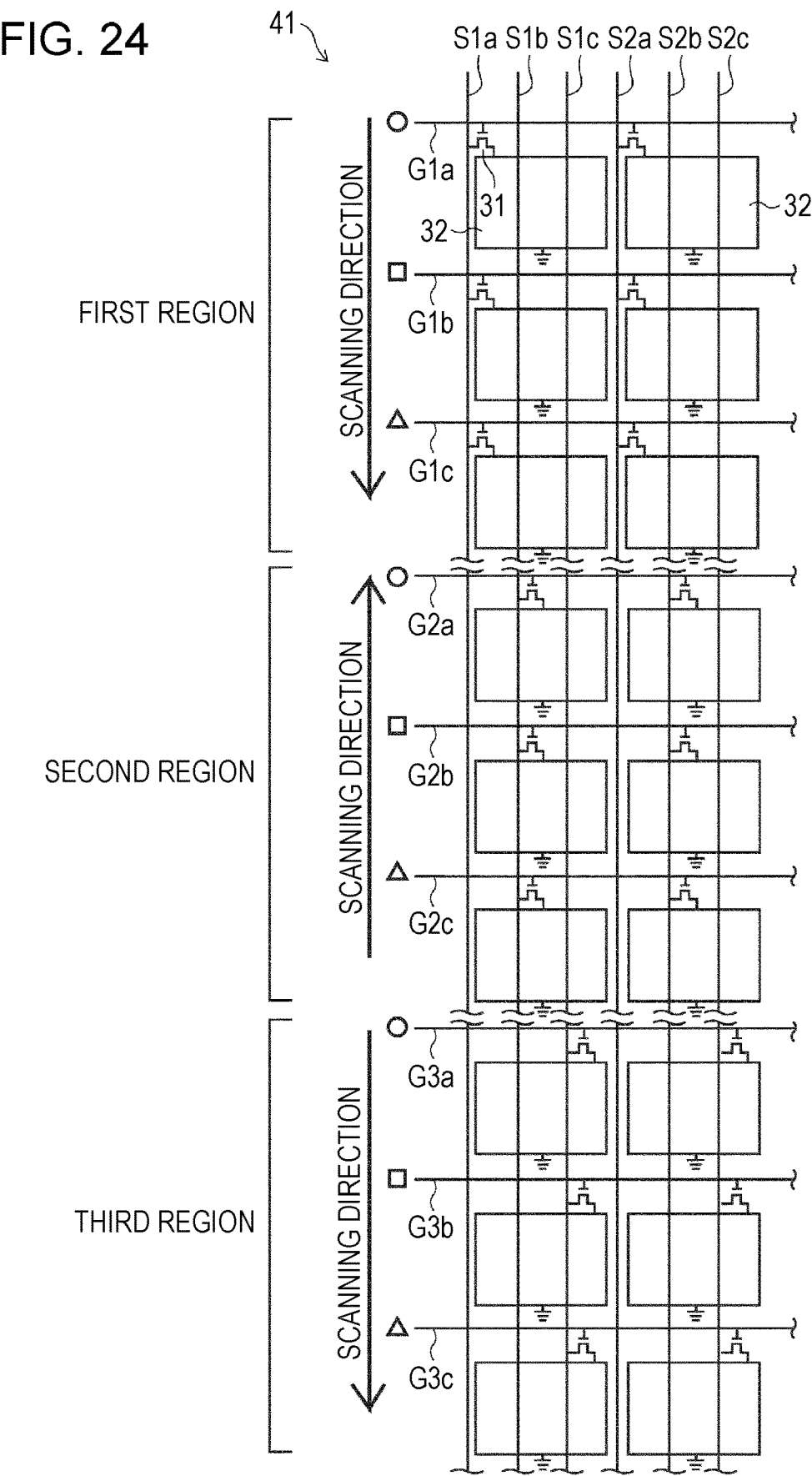
FIG. 24 is a schematic circuit diagram showing a configuration of a TFT substrate included in a liquid crystal display panel shown of a liquid crystal display device of further another reference configuration to which a configuration of a liquid crystal display device of the embodiments of the present disclosure can be applied.

FIG. 24 is an explanatory diagram showing an explanatory diagram of an outline circuit of the TFT substrate 41 included in the liquid crystal display device 4 and scanning directions by the gate drivers GD1 to GD3 (see FIG. 19).

In the liquid crystal display device 4, as shown in FIG. 24, the gate driver GD1 scans the first region from top to bottom, the gate driver GD2 scans the second region from bottom to top, and the gate driver GD3 scans the third region from top to bottom. The other configuration of the liquid crystal display device 4 is the same as that of the liquid crystal display device 2.

(Operation and Advantages of Liquid Crystal Display Device 4)

In the above configuration, the operation of the liquid crystal display device 4 is the same as that of the liquid crystal display device 2 except that the scanning direction of the gate driver GD2 is different from the scanning direction of the gate driver GD2 of the liquid crystal display device 2.

Here, in a time-division drive type liquid crystal display device, generally, while a sufficient response time is given to the liquid crystal layer 23 for a pixel to be scanned first, a sufficient response time is not given to the liquid crystal layer 23 for a pixel to be scanned last, and the backlight is turned on in that state. As a result, a luminance difference occurs between the pixel, to be scanned first and the pixel to be scanned last.

In the liquid crystal display device 4, the gate driver GD1 performs scanning of the first region from top to bottom, the gate driver GD2 performs scanning of the second region from bottom to top, and the gate driver GD3 performs scanning of the third region from top to bottom. Therefore, a lowermost pixel of the first region and an uppermost pixel of the second region, which is adjacent to the lowermost pixel of the first region, are scanned last. A lowermost pixel of the second region and an uppermost pixel of the third region, which is adjacent to the lowermost pixel of the second region, are scanned first. In this way, in the liquid crystal display device 4, pixels adjacent to each other at the boundary between the first region and the second region, and pixels adjacent to each other at the boundary between the second region and the third region, are scanned at the same timing.

Thereby, a luminance difference hardly occurs between the lowermost pixel of the first region and the uppermost pixel of the second region, which is adjacent to the lowermost pixel of the first region, and between the lowermost pixel of the second region and the uppermost pixel of the third region, which is adjacent to the lowermost pixel of the second region. As a result, the liquid crystal display device 4 can perform a good display with small luminance unevenness. The other advantages of the liquid crystal display device 4 are the same as those of the liquid crystal display device 2.

By the configuration of the reference embodiment described above, it is possible to realize a time-division drive type liquid crystal display device at low cost and minimum man-hours and realize a large transparent type display.

A TFT substrate used for so-called MPD (Multi-Pixel Driving) can be used as the TFT substrates 21 and 41 shown in FIGS. 18 and 22. In a configuration where the MPD is used, at least two sub-pixel electrodes are provided to one sub-pixel, the two sub-pixel electrodes are connected to the same data signal line and the same scanning signal line through different transistors, and further a first CS wiring (holding capacity wiring) that forms a capacity together with one of the two sub-pixel electrodes and a second CS wiring that forms a capacity together with the other sub-pixel electrode are provided. The first and the second CS wirings are supplied with CS signals (modulation signals) having different phases. Thereby, it is possible to form a bright region and a dark region in a sub-pixel that displays halftone (a sub-pixel that displays one of red, green, and blue), so that it is possible to improve view angle characteristics and detail clarity.

Conclusion of Reference Embodiments

A liquid crystal display device according to an aspect 1 of the reference embodiments is a liquid crystal display device which includes liquid crystal display panels 12 and 13 having an active matrix substrate (the TFT substrate 41) and the backlight device 19 and performs color display by causing the backlight device 19 to emit light of at least red, green, and blue to the entire panels in time division manner and switching display of the liquid crystal display panels 12 and 13 in synchronization with the emission of the light. In the liquid crystal display device, one pixel is divided into three sub-pixels by source signal lines S, a sub-pixel electrode is provided for each three sub-pixels, a plurality of the sub-pixel electrodes corresponding to the one pixel are connected together by interelectrode connection portions 34 and 51 that cross the source signal lines S in a non-contact state to form one pixel electrode 32, one switching element (TFT 31) is connected to the pixel electrode 32 so that a voltage can be applied to the pixel electrode 32 from the source signal line S, screens of the liquid crystal display panels 12 and 13 are divided into n (n≥2) regions (first to third regions) in an aligned direction of a gate signal line G, the gate signal line G of each divided region is scanned line by line at the same time in each divided region, and the backlight device 19 emits light after the scanning of the gate signal line of each divided region is completed.

According to the configuration described above, a design of an existing liquid crystal display panel that uses a color filter can be used for a design of the liquid crystal display panels 12 and 13 of the liquid crystal display device. Thereby, regarding the liquid crystal display device, it is possible to save design resources, reduce the number of masks whose design will be changed, and reduce design cost. As a result, the liquid crystal display device can be manufactured at low cost.

Further, the screens of the liquid crystal display panels 12 and 13 are divided into n (n≥2) regions in the aligned direction of the gate signal line G, and the gate signal line G of each divided region is scanned line by line at the same time in each divided region. Thereby, it is possible to lower a drive frequency to 1/n and reduce loads of gate drivers and source drivers.

In the aspect 1 described above, a liquid crystal display device according to an aspect 2 of the reference embodiments may be configured so that only one sub-pixel of the three sub-pixels has the switching element (TFT 31).

According to the configuration described above, the liquid crystal display device can be easily manufactured by leaving a switching element of one sub-pixel of the three sub-pixels and removing the switching elements of the other sub-pixels by using a design of a conventional liquid crystal display device.

In the aspect 1 described above, a liquid crystal display device according to an aspect 3 of the reference embodiments may be configured so that each of the three sub-pixels has a switching element (TFT 31) and only one of the switching elements of the three sub-pixels is connected to the pixel electrode 32 so that a voltage can be applied to the pixel electrode 32 from the source signal line S.

According to the configuration described above, the liquid crystal display device can be easily manufactured by connecting only one of the switching elements respectively held by the three sub-pixels to the pixel electrode 32 so that a voltage can be applied to the pixel electrode 32 from the source signal line S.

In any one of the aspects 1 to 3 described above, a liquid crystal display device according to an aspect 4 of the reference embodiments may be configured so that the gate signal line G at a starting end of the scanning in each divided region is the gate signal line G at an end portion on the same side in the aligned direction of the gate signal line G.

According to the configuration described above, the gate signal line G at the starting end of the scanning in each divided region may be the gate signal line G at the end portion on the same side in the aligned direction of the gate signal line G. Thereby, it is possible to directly apply a conventional configuration where each divided region is scanned by each gate driver GD corresponding to each divided region.

In any one of the aspects 1 to 3 described above, a liquid crystal display device according to an aspect 5 of the reference embodiments may be configured so that the gate signal line G at a starting end of the scanning in each divided region (the first region to the third region) is the gate signal line on one end side in the aligned direction of the gate signal lines G in one of the divided regions adjacent to each other (the first and the second regions, or the second and the third regions) and the gate signal line on the other end side in the aligned direction of the gate signal lines G in the other of the divided regions adjacent to each other.

According to the configuration described above, the gate signal line G at the starting end of the scanning in each divided region is the gate signal line on one end side in the aligned direction of the gate signal lines G in one of the divided regions adjacent to each other and the gate signal line on the other end side in the aligned direction of the gate signal lines G in the other of the divided regions adjacent to each other. Therefore, for example, even when a sufficient response time is not given to a liquid crystal layer of a pixel corresponding to the gate signal line G on a terminal end, a luminance difference hardly occurs between the pixel and a pixel at an end portion of another divided region adjacent to the pixel. Thereby, the liquid crystal display device can perform a good display with small luminance unevenness.

A liquid crystal display device according to an aspect 6 of the reference embodiments is a liquid crystal display device which includes a liquid crystal display panel 11 having an active matrix substrate (the TFT substrate 21) and the backlight device 19 and performs color display by causing the backlight device 19 to emit light of at least red, green, and blue to the entire panel in time division manner and switching display of the liquid crystal display panel 11 in synchronization with the emission of the light. In the liquid crystal display device, one pixel is divided into three sub-pixels by source signal lines S, a switching element (TFT 31) and a sub-pixel electrode are provided for each three sub-pixels, a plurality of the sub-pixel electrodes corresponding to the one pixel are connected together by interelectrode connection portions 34 and 51 that cross the source signal lines S in a non-contact state to form one pixel electrode 32, and only one of a plurality of switching elements corresponding to the one pixel is connected to the pixel electrode 32 so that a voltage can be applied to the pixel electrode 32.

According to the configuration described above, a design of an existing liquid crystal display panel that uses a color filter can be used for a design of the liquid crystal display panel 11 of the liquid crystal display device. Thereby, regarding the liquid crystal display device, it is possible to save design resources, reduce the number of masks whose design will be changed, and reduce design cost. As a result, the liquid crystal display device can be manufactured at low cost.

In the aspect 7 described above, a liquid crystal display device according to an aspect 7 of the reference embodiments may be configured so that m (m≥2) gate signal lines G are connected together to be one unit gate signal line and a gate voltage is applied from the gate driver GD for each one unit gate signal line.

According to the configuration described above, in the liquid crystal display device, m (m≥2) gate signal lines G are connected together to be one unit gate signal line and a gate voltage is applied from the gate driver GD for each one unit gate signal line. Thereby, it is possible to lower a drive frequency to 1/n and reduce load of the source driver SD.

In any one of the aspects 1, 3, 6, and 7 described above, a liquid crystal display device according to an aspect 8 of the reference embodiments may be configured so that a drain electrode or a source electrode of the switching elements (TFTs 31) other than the switching element (TFT 31) that is connected to the pixel electrode 32 so that a voltage can be applied to the pixel electrode 32 is disconnected.

According to the configuration described above, the drain electrode or the source electrode of the switching elements (TFTs 31) other than the switching element (TFT 31) that is connected to the pixel electrode 32 so that a voltage can be applied to the pixel electrode 32 is disconnected and the switching elements (TFTs 31) are caused to be disconnected from the pixel electrode, so that it is possible to easily use a design of a conventional liquid crystal display device having a switching element for each three sub-pixels.

In any one of the aspects 1 to 8 described above, a liquid crystal display device according to an aspect 9 of the reference embodiments may be configured so that the interelectrode connection portion 51 includes a gate layer 52 that crosses the source signal line S in a non-contact state.

According to the configuration described above, the interelectrode connection portion 51 includes the gate layer 52 that crosses the source signal line S in a non-contact state. Specifically, a plurality of sub-pixel electrodes corresponding to one pixel are connected together by the interelectrode connection portion 51 including the gate layer 52 that crosses the source signal line S in a non-contact state to form one pixel electrode 32.

The gate layer 52 is composed of a metal such as aluminum whose resistance is lower than that of ITO, so that charges can pass through the gate layer 52 even when a line width of the gate layer 52 is small and thereby the pixel can be charged. Thereby, it is possible to reduce parasitic capacitance by reducing an area overlapped with the source signal line S as compared with a case where the ITO is used for the interelectrode connection portion 51, so that it is possible to suppress potential variation of the source signal, that is, potential variation of the pixel electrode 32.

In any one of the aspects 1 to 5 described above, a liquid crystal display device according to an aspect 10 of the reference embodiments may be configured so that the gate drivers GD1 to GD3 composed of a chip on film are included for each n regions, and in the film mounted with the gate drivers GD1 to GD3, a wiring pattern that sequentially sends a start pulse inputted into a gate driver on a starting end side toward a gate driver on a terminal end side is modified to a wiring pattern where the start pulse can be inputted into the gate drivers GD1 to GD3 in parallel.

According to the configuration described above, it is possible to easily form the on chip film mounted with the gate drivers GD1 to GD3 by using a conventional, configuration having a wiring pattern that sequentially sends a start pulse inputted into a gate driver on a starting end side toward a gate driver on a terminal end side.

CONCLUSION

A liquid crystal display device according to an aspect 1 of the present disclosure is a liquid crystal display device including a plurality of pixels, each of which is composed of divided three sub-pixels. The liquid crystal display device includes sub-pixel electrodes 101a to 101c respectively provided to the sub-pixels, and an interelectrode connection portion 103 that connects sub-pixel electrodes adjacent to each other among the sub-pixel electrodes. The interelectrode connection portion 103 is provided in a position where boundaries of liquid crystal alignment directions of sub-pixels adjacent to each other are connected.

According to the configuration described above, the liquid crystal alignment directions in the liquid crystal display panels 111 and 131 to 133 are not largely different from the liquid crystal alignment directions in a case where no interelectrode connection portion 103 is provided. Therefore, it is possible to suppress influence on the liquid crystal alignment directions in each sub-pixel due to provision of the interelectrode connection portion 103. As a result, the liquid crystal display device can prevent luminance degradation and display failure from occurring.

Further, the TFT substrate 21 of the liquid crystal display panels 111 and 131 to 133 can use a conventional design, so that it is possible to reduce design cost and manufacture a liquid crystal display device of, for example, a field sequential color system at low price.

In the aspect 1 described above, a liquid crystal display device according to an aspect 2 of the present disclosure may be configured so that the interelectrode connection portion 103 is provided in a central portion of a long side of the sub-pixel.

According to the configuration described above, it is possible to highly accurately suppress influence on the liquid crystal alignment directions in each sub-pixel due to provision of the interelectrode connection portion 103, and the liquid crystal display device can prevent luminance degradation and display failure from occurring.

In the aspect 1 described above, a liquid crystal display device according to an aspect 3 of the present disclosure may be configured so that structures 143 that control the liquid crystal alignment directions are included, at least two structures 143 are formed so as to straddle the sub-pixels adjacent to each other, and the interelectrode connection portion 103 is provided for each two structures 143 and is provided so as to be overlapped with at least part of the structures 143 corresponding to the interelectrode connection portion 103.

According to the configuration described above, it is possible to cope with a configuration including the structures 143 that control the liquid crystal alignment directions, and it is possible to prevent luminance degradation and display failure of the liquid crystal display device from occurring.

In the aspect 3 described above, a liquid crystal display device according to an aspect 4 of the present disclosure may be configured so that the interelectrode connection portion 103 is provided so that the center line of the interelectrode connection portion 103 overlaps with the center line of corresponding structures 143.

According to the configuration described above, it is possible to highly accurately suppress influence on the Liquid crystal alignment directions in each sub-pixel due to provision of the interelectrode connection portion 103, and the liquid crystal display device can prevent luminance degradation and display failure from occurring.

In the aspect 3 or 4 described above, a liquid crystal display device according to an aspect 5 of the present disclosure may be configured so that branch extension portions 143a extending along a long side direction of the sub-pixel electrodes 101a to 101c between the sub-pixel electrodes 101a to 101c adjacent to each other are removed from the structure 145.

According to the configuration described above, the branch extension portions 143a are removed from the structure 145, so that when the interelectrode connection portion 103 is provided, irregularity of the liquid crystal alignment directions due to existence of the branch extension portions 143a does not occur. Thereby, it is possible to further suppress deviations of the liquid crystal alignment directions due to provision of the interelectrode connection portion 103, and the liquid crystal display device can further prevent luminance degradation and display failure from occurring.

In any one of the aspects 1 to 5 described above, a liquid crystal display device according to an aspect 6 of the present disclosure may be configured so that the three sub-pixels are formed by dividing one pixel into three sub-pixels by source signal lines, liquid crystal display panels 111 and 131 to 133 having an active matrix substrate (TFT substrate 21) and a backlight device 19 are included, and color display is performed by causing the backlight device 19 to emit light of at least red, green, and blue to the entire panels in time division manner and switching display of the liquid crystal display panels 111 and 131 to 133 in synchronization with the emission of the light.

According to the configuration described above, the liquid crystal display device can be configured as a time-division drive type liquid crystal display device which performs color display where the backlight device 19 emits light of red, green, and blue in time division manner.

The present disclosure is not limited to the embodiments described above, but can be variously modified within the scope of the claims. An embodiment obtained by appropriately combining technical units disclosed in different embodiments is also included in the technical scope of the present disclosure. Further, it is possible to form novel technical features by combining the technical units disclosed respectively in the embodiments.

The present disclosure contains subject matter related to that disclosed in Japanese Priority Patent Application JP 2018-057180 filed in the Japan Patent Office on Mar. 23, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device provided with a plurality of pixels, each of which is composed of divided three sub-pixels, the liquid crystal display device comprising:
   sub-pixel electrodes respectively provided to the sub-pixels; and
   an interelectrode connection portion that connects sub-pixel electrodes adjacent to each other among the sub-pixel electrodes,
   wherein the interelectrode connection portion is provided in a position where boundaries of liquid crystal alignment directions of sub-pixels adjacent to each other are connected,
   the three sub-pixels are formed by dividing one pixel into three sub-pixels by source signal lines,
   a liquid crystal display panel having an active matrix substrate and a backlight device are included, and
   color display is performed by causing the backlight device to emit light of at least red, green, and blue to an entire panel in time division manner and switching display of the liquid crystal display panel in synchronization with the emission of the light.

2. The liquid crystal display device according to claim 1, wherein
   the interelectrode connection portion is provided in a central portion of a long side of the sub-pixel.

3. The liquid crystal display device according to claim 1, further comprising:
   structures that control the liquid crystal alignment directions
   wherein at least two structures are formed so as to straddle the sub-pixels adjacent to each other, and
   the interelectrode connection portion is provided for each two structures and is provided so as to be overlapped with at least part of the structures corresponding to the interelectrode connection portion.

4. The liquid crystal display device according to claim 3, wherein
   the interelectrode connection portion is provided so that a center line of the interelectrode connection portion overlaps with a center line of corresponding structures.

5. The liquid crystal display device according to claim 3, wherein a branch extension portion extending along a long side direction of the sub-pixel electrode between the sub-pixel electrodes adjacent to each other is removed from the structure.

* * * * *